United States Patent
Wada

(10) Patent No.: US 8,297,752 B2
(45) Date of Patent: Oct. 30, 2012

(54) SPECTACLE LENS SELECTION METHOD AND SPECTACLE LENS SELECTION SYSTEM

(75) Inventor: Osamu Wada, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/150,733

(22) Filed: Jun. 1, 2011

(65) Prior Publication Data
US 2011/0299033 A1    Dec. 8, 2011

(30) Foreign Application Priority Data

Jun. 2, 2010 (JP) .................. 2010-126712

(51) Int. Cl.
*A61B 3/00* (2006.01)
*A61B 3/10* (2006.01)
(52) U.S. Cl. ...................... 351/204; 351/200
(58) Field of Classification Search .......... 351/200, 351/203–206, 211, 208, 221, 222, 243–245
See application file for complete search history.

(56) References Cited

U.S. PATENT DOCUMENTS

| | | | |
|---|---|---|---|
| 5,984,473 | A | 11/1999 | Livnat |
| 6,827,443 | B2 | 12/2004 | Fisher et al. ............. 251/209 |
| 7,909,460 | B1 | 3/2011 | Wada |
| 2007/0242220 | A1 | 10/2007 | Guilloux et al. |
| 2010/0134755 | A1* | 6/2010 | Kaga et al. ............... 351/169 |
| 2010/0290001 | A1* | 11/2010 | Kaga et al. ............... 351/169 |
| 2011/0157549 | A1 | 6/2011 | Wada |

FOREIGN PATENT DOCUMENTS

| | | |
|---|---|---|
| EP | 1 959 294 A2 | 11/2004 |
| EP | 1728467 A1 | 12/2006 |
| EP | 1830222 A1 | 9/2007 |
| EP | 2340760 A1 | 7/2011 |
| JP | 2003-523244 | 8/2003 |
| JP | 2008-521027 | 6/2008 |
| WO | 9901791 A1 | 1/1999 |

OTHER PUBLICATIONS

Wolfgang Schulz et al., "Zentrieren von Gleitsichtbrillen" Brillenanpassung, DOZ-Verlag, pp. 69-73, 1997.
Extended European search report dated Sep. 22, 2011 for corresponding European application 11168206.8 cites the non-patent literature, foreign patent documents and U.S. patent above.
Toyohiko Hatada: "Binocular vision and eyeglasses", Japanese Society of Ophthalmological Optics, Science of Eyeglasses vol. 1, pp. 34-37, 1977.

* cited by examiner

*Primary Examiner* — Scott J Sugarman
*Assistant Examiner* — Brandi Thomas
(74) *Attorney, Agent, or Firm* — DLA Piper LLP (US)

(57) ABSTRACT

An eyeball infraduction value Indih is measured, and then $\Delta E$ is determined from an equation $\Delta E = \text{Indih} - (Fh + SPh + Nh)$ based on the eyeball infraduction value Indih, a distance portion eyepoint height Fh, a progressive corridor length SPh, and a reading portion eyepoint height Nh, and Oh is determined from an equation of $Oh = Bh - (Fh + SPh + Nh + \Delta E + Uh)$ based on the $\Delta E$, a lens portion height Bh, the distance portion eyepoint height Fh, the progressive corridor length SPh, the reading portion eyepoint height Nh, and a lower frame height Uh. A spectacle lens that satisfies conditions of $0 \text{ mm} \leq \Delta E \leq 2$ mm and $0 \text{ mm} < Oh$ is selected.

10 Claims, 22 Drawing Sheets

| Fh4 | Indih | S4 | S5 | S6 | S7 | S8 | S9 | S10 | S11 | S12 | S13 | S14 | S15 |
|---|---|---|---|---|---|---|---|---|---|---|---|---|---|
| 4 | 11 | 1 | 0 | -1 | -2 | -3 | -4 | -5 | -6 | -7 | -8 | -9 | -10 |
| 4 | 11.5 | 1.5 | 0.5 | -0.5 | -1.5 | -2.5 | -3.5 | -4.5 | -5.5 | -6.5 | -7.5 | -8.5 | -9.5 |
| 4 | 12 | 2 | 1 | 0 | -1 | -2 | -3 | -4 | -5 | -6 | -7 | -8 | -9 |
| 4 | 12.5 | 2.5 | 1.5 | 0.5 | -0.5 | -1.5 | -2.5 | -3.5 | -4.5 | -5.5 | -6.5 | -7.5 | -8.5 |
| 4 | 13 | 3 | 2 | 1 | 0 | -1 | -2 | -3 | -4 | -5 | -6 | -7 | -8 |
| 4 | 13.5 | 3.5 | 2.5 | 1.5 | 0.5 | -0.5 | -1.5 | -2.5 | -3.5 | -4.5 | -5.5 | -6.5 | -7.5 |
| 4 | 14 | 4 | 3 | 2 | 1 | 0 | -1 | -2 | -3 | -4 | -5 | -6 | -7 |
| 4 | 14.5 | 4.5 | 3.5 | 2.5 | 1.5 | 0.5 | -0.5 | -1.5 | -2.5 | -3.5 | -4.5 | -5.5 | -6.5 |
| 4 | 15 | 5 | 4 | 3 | 2 | 1 | 0 | -1 | -2 | -3 | -4 | -5 | -6 |
| 4 | 15.5 | 5.5 | 4.5 | 3.5 | 2.5 | 1.5 | 0.5 | -0.5 | -1.5 | -2.5 | -3.5 | -4.5 | -5.5 |
| 4 | 16 | 6 | 5 | 4 | 3 | 2 | 1 | 0 | -1 | -2 | -3 | -4 | -5 |
| 4 | 16.5 | 6.5 | 5.5 | 4.5 | 3.5 | 2.5 | 1.5 | 0.5 | -0.5 | -1.5 | -2.5 | -3.5 | -4.5 |
| 4 | 17 | 7 | 6 | 5 | 4 | 3 | 2 | 1 | 0 | -1 | -2 | -3 | -4 |
| 4 | 17.5 | 7.5 | 6.5 | 5.5 | 4.5 | 3.5 | 2.5 | 1.5 | 0.5 | -0.5 | -1.5 | -2.5 | -3.5 |
| 4 | 18 | 8 | 7 | 6 | 5 | 4 | 3 | 2 | 1 | 0 | -1 | -2 | -3 |
| 4 | 18.5 | 8.5 | 7.5 | 6.5 | 5.5 | 4.5 | 3.5 | 2.5 | 1.5 | 0.5 | -0.5 | -1.5 | -2.5 |
| 4 | 19 | 9 | 8 | 7 | 6 | 5 | 4 | 3 | 2 | 1 | 0 | -1 | -2 |
| 4 | 19.5 | 9.5 | 8.5 | 7.5 | 6.5 | 5.5 | 4.5 | 3.5 | 2.5 | 1.5 | 0.5 | -0.5 | -1.5 |
| 4 | 20 | 10 | 9 | 8 | 7 | 6 | 5 | 4 | 3 | 2 | 1 | 0 | -1 |
| 4 | 20.5 | 10.5 | 9.5 | 8.5 | 7.5 | 6.5 | 5.5 | 4.5 | 3.5 | 2.5 | 1.5 | 0.5 | -0.5 |

FIG. 15

SPECTACLE LENS SELECTION METHOD AND SPECTACLE LENS SELECTION SYSTEM

This application claims priority to Japanese Patent Application No. 2010-126712, filed Jun. 2, 2010, the entirety of which is hereby incorporated by reference.

BACKGROUND

1. Technical Field

The present invention relates to a spectacle lens selection method for selecting a spectacle lens from a plurality of types of spectacle lens including a distance portion, a progressive corridor, and a reading portion with the distance portion having different sizes from narrow to wide. The present invention also relates to a system for selecting the spectacle lens.

2. Related Art

Spectacle lenses are classified into single-vision spectacle lenses and progressive-power spectacle lenses. A progressive-power lens includes a distance portion located in an upper portion of the lens and provided to view a distant object, a reading portion located in a lower portion of the lens and provided to view a near object, a progressive corridor which is located between the distance portion and the reading portion and where the power continuously changes, and other portions called "sideways portions" or "peripheral portions."

The distance portion, the progressive corridor, and the reading portion are designed based on wearer optometry information, frame information, spectacle lens information, and other information, and a variety of spectacle lenses are designed in accordance with such conditions and other conditions associated with individual wearers.

To design such a spectacle lens, there has been a spectacle lens design method of related art in which information from an eyeball motion measurement unit is used along with software to analyze a path along which an eyeball of a person wearing spectacles moves so that at least one eyepoint or an average area thereof is identified, and a standard lens is corrected based on the identified information to form a custom spectacle lens that suits the specific eye of the person (JP-T-2008-521027, the term "JP-T" as used herein means a published Japanese translation of a PCT patent application).

There has been another method of related art for providing frame selection guidance and recommending optimum lens design selected from a plurality of types of known lens. In the method, values provided from a head tracking system and statistical analysis results obtained by using a spectacle wearer action statistical model are used to determine a visual action pattern of an individual spectacle wearer (JP-T-2003-523244).

In the related art described in JP-T-2008-521027, in which an eyeball motion measurement unit provides information on the motion of an eye and the head, which is then analyzed by using software, it is not clear how the measured motion of the head and the eyeball of an individual wearer is used in lens design in accordance with the application of the lens. In particular, the fact that many factors involved in designing a progressive-power spectacle lens are not clearly prioritized does not ensure that rational lens design can be performed. Further, use of an eyeball motion measurement unit disadvantageously increases the cost as a whole.

In the related art described in JP-T-2003-523244, it is not clear, as in JP-T-2008-521027, how information on the motion of the head and an eye of an individual wearer is used in lens design in accordance with the application of the spectacles. Further, use of a head tracking system disadvantageously increases the cost as a whole and requires a long measurement period.

SUMMARY

An advantage of some aspects of the invention is to provide a spectacle lens selection method and a spectacle lens selection system capable of selecting an optimum spectacle lens at low cost for each individual wearer.

A first aspect of the invention is directed to a spectacle lens selection method to select a single spectacle lens including a distance portion, a progressive corridor, and a reading portion from a plurality of target spectacle lens comprising: determining a horizontal fixation field width Fw extending from a distance eyepoint in a horizontal direction, measuring an eyeball infraduction value Indih, the Indih being a length from the distance eyepoint to a reading eyepoint, determining a $\Delta E$ from Equation (1) based on the Indih, a distance portion eyepoint height Fh from a boundary between the distance portion and the progressive corridor to the distance eyepoint, a progressive corridor length SPh, the SPh being a length from the boundary between the distance portion and the progressive corridor to a boundary between the progressive corridor and the reading portion, and a reading portion eyepoint height Nh from the boundary between the progressive corridor and the reading portion to an optical center of the reading portion, determining a th from Equation (2) based on the Fh, the SPh, and the Nh, and determining an upper frame height Oh from the distance eyepoint to an upper end of a test spectacle lens from Equation (3) based on a lens portion height Bh of the test spectacle lens, the th, the $\Delta E$, and a lower frame height Uh from a lower end of the test spectacle lens to the reading eyepoint, $$\Delta E = Indih - (Fh + SPh + Nh) \quad (1).$$

$$th = Fh + SPh + Nh \quad (2)$$

$$Oh = Bh - (th + \Delta E + Uh) \quad (3),$$

judging a target spectacle lens that satisfies the Fw and conditions of $0 \text{ mm} \leq \Delta E \leq 2 \text{ mm}$ and $0 \text{ mm} < Oh$, and selecting a spectacle lens that satisfied the Fw and the conditions.

In the configuration of the first aspect of the invention, the $\Delta E$ is calculated based on the eyeball infraduction value Indih measured, and the distance portion eyepoint height Fh, the progressive corridor length SPh, and the reading portion eyepoint height Nh, which have been determined in advance, and Oh is calculated based on the $\Delta E$, and the lens portion height Bh, the distance portion eyepoint height Fh, the progressive corridor length SPh, the reading portion eyepoint height Nh, and the lower frame height Uh, which have been determined in advance. In judging a target spectacle lens, when a target spectacle lens in question satisfies the horizontal fixation field width Fw determined, $\Delta E$ satisfies a condition of $0 \text{ mm} \leq \Delta E \leq 2 \text{ mm}$, and Oh satisfies a condition of $0 \text{ mm} < Oh$, the spectacle lens is selected as an appropriate one.

In selecting a spectacle lens in the first aspect of the invention, since the spectacle lens in question is required as described above to satisfy the fixed horizontal fixation field width Fw determined in the horizontal fixation field width determining step, a horizontal range within which the wearer can view objects without moving the head is ensured. Further, since it is required as described above to satisfy $0 \text{ mm} \leq \Delta E$, the eyeball infraduction value Indih of the wearer is equal to or greater than the total of the distance portion eyepoint height Fh, the progressive corridor length SPh, and the reading portion eyepoint height Nh, whereby the wearer can see objects through the distance portion and reading portion of the spectacle lens. Moreover, since $\Delta E \leq 2$ mm, rational design can be performed with a 2-mm margin of the frame taken into consideration. Further, since 0 mm<Oh, the wearer can view an object through the distance portion of the lens in forward vision. On the other hand, to sufficiently cover an effective field of view of a person (which is a range within which the person uses visual information effectively), it is preferable that 9 mm≦Oh. The effective field of view of a person is typically believed to be 20° or smaller (see Science of Spectacles, 1977), and an ideal spectacle fitting state (in which a spectacle fitting distance is 12 mm) calculated based on the effective field of view described above corresponds to 9 mm≦Oh, which allows the distance portion of the lens to cover the effective field of view. In practice, however, since the spectacle fitting distance varies depending on the profile of the face and other factors, Oh does not necessarily satisfy 9 mm≦Oh. A single spectacle lens is then selected from a plurality of types of spectacle lens having different distance portion sizes in accordance with the distance portion eyepoint height Fh. When the distance portion eyepoint height Fh is large, a spectacle lens having a narrow distance portion is selected, whereas when the distance portion eyepoint height Fh is small, a spectacle lens having a wide distance portion is selected.

As described above, in the first aspect of the invention, since factors of high importance are used in judgment on selection of one type from a plurality of types of progressive-power spectacle lens, rational spectacle lens design can be performed. Further, no unit for capturing motion of the eye and the head or no software for performing complicated processes is necessary, whereby the spectacle lens selection can be performed at low cost.

It is preferable that judging a target spectacle lens is first carried out for a spectacle lens having narrow distance portion, when the Fh does not satisfy the corresponding one of the conditions, judging a target spectacle lens is carried out for a spectacle lens having wider distance portion than the spectacle lens having narrow distance portion of which is narrow.

In the above configuration of the first aspect of the invention, since the judging is carried out for spectacle lenses in ascending order of the size of the distance portion, that is, from a narrow distance portion to a wide distance portion, a preferred spectacle lens can be provided to a wearer who uses a progressive-power spectacle lens for the first time or a wearer who has used a progressive-power spectacle lens only for a short period. That is, a spectacle lens having a wide distance portion has a large amount of aberration, which means that the eyes of the wearer tend to be under stress, whereas a spectacle lens having a narrow distance portion has a small amount of aberration, which means that the eyes of the wearer are under little stress. For a wearer who uses a progressive-power spectacle lens for the first time and other similar wearers, a spectacle lens having a narrow distance portion and hence a small amount of aberration is first offered and it is judged whether or not the spectacle lens satisfies the conditions in the judging a target spectacle lens. Rationally spectacle lens selection can thus be performed.

It is preferable that in selecting a single spectacle lens from three types of target spectacle lens having a horizontal fixation field width Fw greater than 6 mm, a type in which the distance portion is narrow, a type in which the distance portion is wide, and a type in which the distance portion is intermediate, a spectacle lens having a narrow distance portion is selected when 4 mm<Fh, a spectacle lens having an intermediate distance portion is selected when 3 mm<Fh≦4 mm, and a spectacle lens having a wide distance portion is selected when 1 mm.

In the above configuration of the first aspect of the invention, a single spectacle lens mainly for reading and distance vision preferable to a wearer can be rationally selected from the three types of spectacle lens, the type in which the distance portion is wide, the type in which the distance portion is intermediate, and the type in which the distance portion is narrow.

It is preferable that in selecting a single spectacle lens from three types of spectacle lens having a horizontal fixation field width Fw greater than 4.5 mm but smaller than or equal to 6 mm, a type in which the distance portion is narrow, a type in which the distance portion is wide, and a type in which the distance portion is intermediate, a spectacle lens having a narrow distance portion is selected when 3 mm<Fh, a spectacle lens having an intermediate distance portion is selected when 2.5 mm<Fh≦3 mm, and a spectacle lens having a wide distance portion is selected when 0.8 mm≦Fh≦2.5 mm.

In the above configuration of the first aspect of the invention, a single spectacle lens mainly for reading and intermediate vision preferable to a wearer can be rationally selected from the three types of spectacle lens, the type in which the distance portion is wide, the type in which the distance portion is intermediate, and the type in which the distance portion is narrow.

It is preferable that in selecting a single spectacle lens from three types of spectacle lens having a horizontal fixation field width Fw greater than 3.75 mm but smaller than or equal to 4.5 mm, a type in which the distance portion is narrow, a type in which the distance portion is wide, and a type in which the distance portion is intermediate, a spectacle lens having a narrow distance portion is selected when 2.5 mm<Fh, a spectacle lens having an intermediate distance portion is selected when 2 mm<Fh≦2.5 mm, and a spectacle lens having a wide distance portion is selected when 0.5 mm≦Fh≦2 mm.

In the above configuration of the first aspect of the invention, a single spectacle lens mainly for reading and reading vision preferable to a wearer can be rationally selected from the three types of spectacle lens, the type in which the distance portion is wide, the type in which the distance portion is intermediate, and the type in which the distance portion is narrow.

It is preferable that the horizontal fixation field width Fw is determined from Equation (4) based on a horizontal fixation field angle Fa and a spectacle fitting distance EL between the distance eyepoint and an eyeball.

$$Fw = EL \times \tan Fa \quad (4)$$

In the above configuration of the first aspect of the invention, the horizontal fixation field width Fw can be readily and accurately calculated, whereby the judgment step can be carried out based on an accurate judgment criterion and a correct spectacle lens can be selected. That is, the horizontal fixation field angle Fa, which defines a horizontal angular range within which the wearer can view objects without moving the head, is determined more accurately than the horizontal fixation field width Fw is directly determined. Further, the spectacle fitting distance EL between the distance eyepoint and the eyeball can be readily determined by capturing an image of a side of the wearer and analyzing the image. As a result, the horizontal fixation field width Fw can be readily and accurately determined from Equation (4) based on the horizontal fixation field angle Fa and the spectacle fitting distance EL.

It is preferable that in the horizontal fixation field width determining step, the horizontal fixation field angle Fa is predetermined range value.

In the above configuration of the first aspect of the invention, based on the fact that the horizontal fixation viewing angle Fa varies little among individual wearers, the horizontal fixation field width Fw can be readily determined by setting the angle at a fixed value.

A second aspect of the invention is directed to a spectacle lens selection system to select a spectacle lens including a distance portion, a progressive corridor, and a reading portion, comprising a horizontal fixation field width determination unit that determines a horizontal fixation field width Fw extending from a distance eyepoint of a test spectacle lens in a horizontal direction, an eyeball infraduction value measurement unit that measures an eyeball infraduction value Indih, the Indih being a length from the distance eyepoint to a reading eyepoint, and a selection unit that selects a single spectacle lens from a plurality of types of target spectacle lens based on information containing the value measured by the eyeball infraduction value measurement unit. The selection unit includes a computation section that determines a ΔE from Equation (1) based on the Indih, a distance portion eyepoint height Fh from a boundary between the distance portion and the progressive corridor to the distance eyepoint, a progressive corridor length SPh, the SPh being the length from the boundary between the distance portion and the progressive corridor to a boundary between the progressive corridor and the reading portion, and a reading portion eyepoint height Nh from the boundary between the progressive corridor and the reading portion to an optical center of the reading portion, determines a th from Equation (2) based on the Fh, the SPh, and the Nh, and determines an upper frame height Oh from the distance eyepoint to an upper end of a test spectacle lens from Equation (3) based on a lens portion height Bh of the test spectacle lens, the th, the ΔE, and a lower frame height Uh from a lower end of the spectacle lens to the reading eyepoint, $$\Delta E = Indih - (Fh + SPh + Nh) \quad (1).$$

$$th = Fh + SPh + Nh \quad (2)$$

$$Oh = Bh - (th + \Delta E + Uh) \quad (3) \text{ and}$$

a judgment section that judges a target spectacle lens that satisfies the Fw unit and conditions of 0 mm≦ΔE≦2 mm and 0 mm<Oh, and selects a spectacle lens that satisfied the Fw and the conditions.

In the above configuration of the second aspect of the invention, a system that can provide the advantageous effects described above can be provided.

It is preferable that the eyeball infraduction value measurement unit further includes a sight line position detecting unit that detects the position of a sight line of a spectacle wearer that corresponds to the distance eyepoint and a position of the sight line of the spectacle wearer that corresponds to the reading eyepoint and a length calculating unit that calculates the length between the position of the distance eyepoint and the position of the reading eyepoint detected by the sight line position detecting unit and outputs the calculated value to the computation section.

In the above configuration of the second aspect of the invention, since the position of the line of sight of an eyeball that looks at the reading eyepoint differs from the position of the line of sight of the eyeball that looks at the distance eyepoint, the eyeball infraduction value can be readily measured by detecting these positions.

It is preferable that the spectacle lens selection system further includes a forward inclination angle measuring unit that measures a forward inclination angle of a frame to which the spectacle lens is attached.

In the above configuration of the second aspect of the invention, since the forward inclination angle can be measured with a wearer wearing the spectacles, the forward inclination angle can be accurately measured even when the spectacle lens is worn by the wearer.

BRIEF DESCRIPTION OF THE DRAWINGS

The invention will be described with reference to the accompanying drawings, wherein like numbers reference to like elements.

FIG. 15 is a table showing computed values provided from a computation section.

DESCRIPTION OF EXEMPLARY EMBODIMENTS

An embodiment of the invention will be described below with reference to the drawings.

In the present embodiment, a progressive-power lens is used as a spectacle lens. Further, the present embodiment will be described under the following definitions: The vertical direction with respect to a person wearing spectacles is an up-down direction, and the horizontal direction with respect to the person wearing spectacles is a right-left direction.

Spectacle Lens

Figure 1:
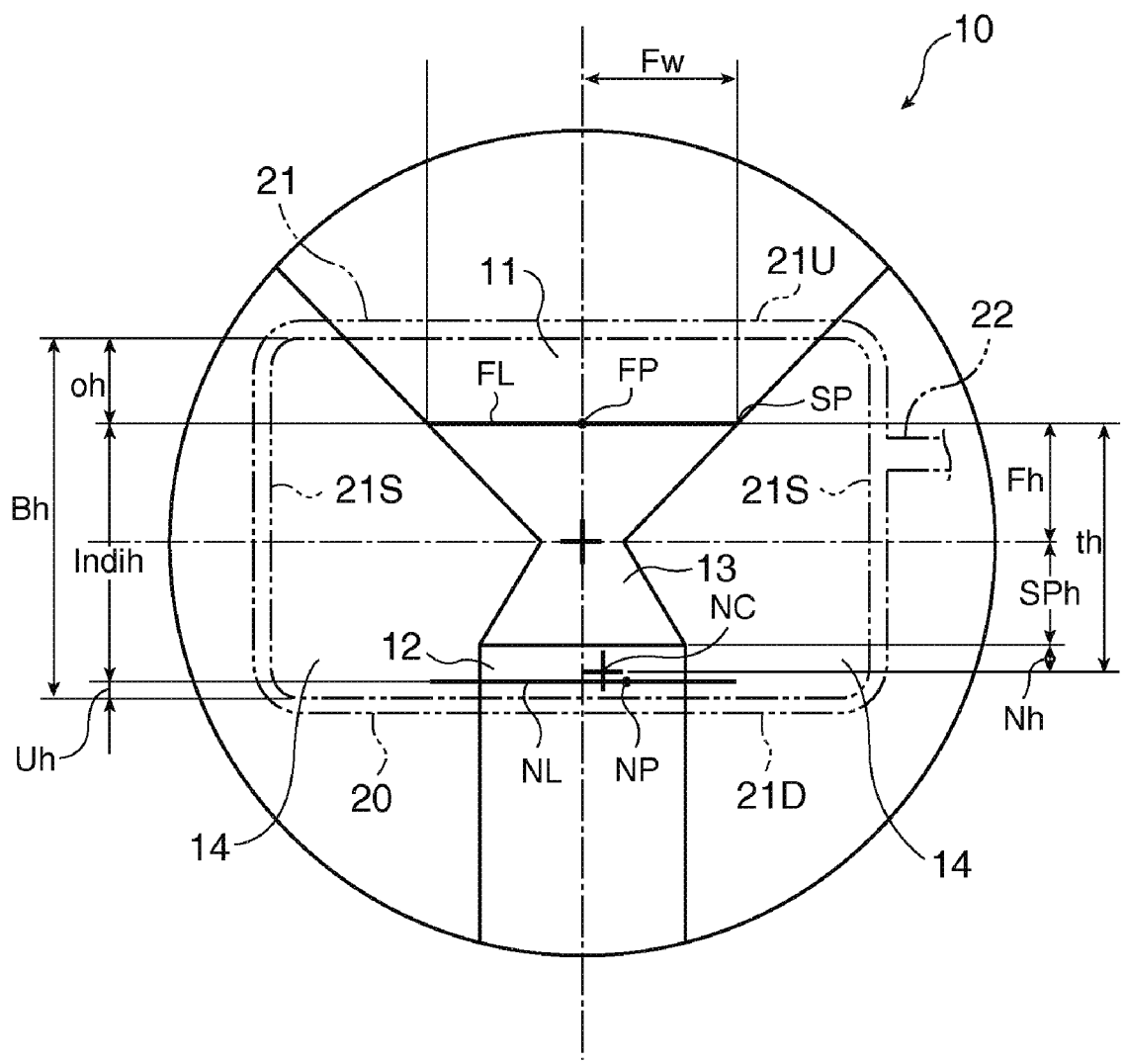
FIG. 1 is a schematic view of a spectacle lens to be measured with an eyeball infraduction value measurement unit according to an embodiment of the invention.

A spectacle lens 10 includes a distance portion 11 located in an upper portion of the lens, a reading portion 12 located in a lower portion of the lens, a progressive corridor 13 located between the distance portion 11 and the reading portion 12, and sideways portions 14 adjacent to the progressive corridor 13 in the sideways direction, as shown in FIG. 1.

The distance portion 11 has relatively positive, low average dioptric power suitable for distance vision. In particular, a distance eyepoint FP is defined as a position where a horizontal line passing through the center of the pupil (that is, line of sight) passes when the wearer views an object in forward vision. The distance eyepoint FP is located at an intersection of a line extending upward in the vertical direction from the geometric center of the spectacle lens and a distance eyepoint line FL.

The reading portion 12 has relatively positive, high average dioptric power suitable for near vision (reading, for example). In particular, a reading eyepoint NP is defined as a position where the line of sight passes when the wearer views a near object (looks downward).

The progressive corridor 13 is a portion which is located between the distance portion 11 and the reading portion 12 and where relatively positive average addition dioptric power progressively changes.

The distance eyepoint line FL is a straight line passing through the distance eyepoint FP and extending in the right-left direction. The distance along the distance eyepoint line FL from the distance eyepoint FP to the boundary line between the distance portion 11 and the adjacent sideways portion 14 is called a horizontal fixation field width Fw.

A straight line passing through the reading eyepoint NP and extending in the right-left direction is called a reading eyepoint line NL. The distance (length) between the distance eyepoint line FL and the reading eyepoint line NL is called an eyeball infraduction value Indih.

The distance from the boundary line between the distance portion 11 and the progressive corridor 13 to the distance eyepoint FP is a distance portion eyepoint height Fh. The length (distance) from the boundary line between the distance portion 11 and the progressive corridor 13 to the boundary line between the progressive corridor 13 and the reading portion 12 is a progressive corridor length SPh.

The length (distance) from the boundary line between the progressive corridor 13 and the reading portion 12 to an optical center NC in the reading portion 12 is a reading portion eyepoint height Nh. The optical center NC in the reading portion 12 is an optical center for optical design of the reading portion.

The sideways portions 14 are called astigmatism areas. Since an object viewed through either of the sideways portions 14 is recognized as a double image, the wearer does not typically view an object through the sideways portions 14.

The spectacle lens 10 is manufactured by shaping (edging) such a progressive-power lens, and the resultant spectacle lens 10 is attached to a frame 20 to form spectacles.

The frame 20 includes a frame rim 21 to which the spectacle lens 10 is attached and which surrounds the spectacle lens 10, a bridge 22 that connects right and left frame rims 21 to each other, and a temple 23 (see FIG. 6) pivotally attached to the frame rim 21 via a hinge. The frame rim 21 has an upper side 21U, a lower side 21D, and sideways sides 21S. The distance between the upper side 21U and the lower side 21D is called a lens portion height Bh of the spectacle lens (height of a edged lens), and the distance from the distance eyepoint FP to the upper side of the frame is called an upper frame height Oh. The distance from the lower side 21D of the frame rim 21 to the reading eyepoint NP is called a lower frame height Uh.

Figure 2:
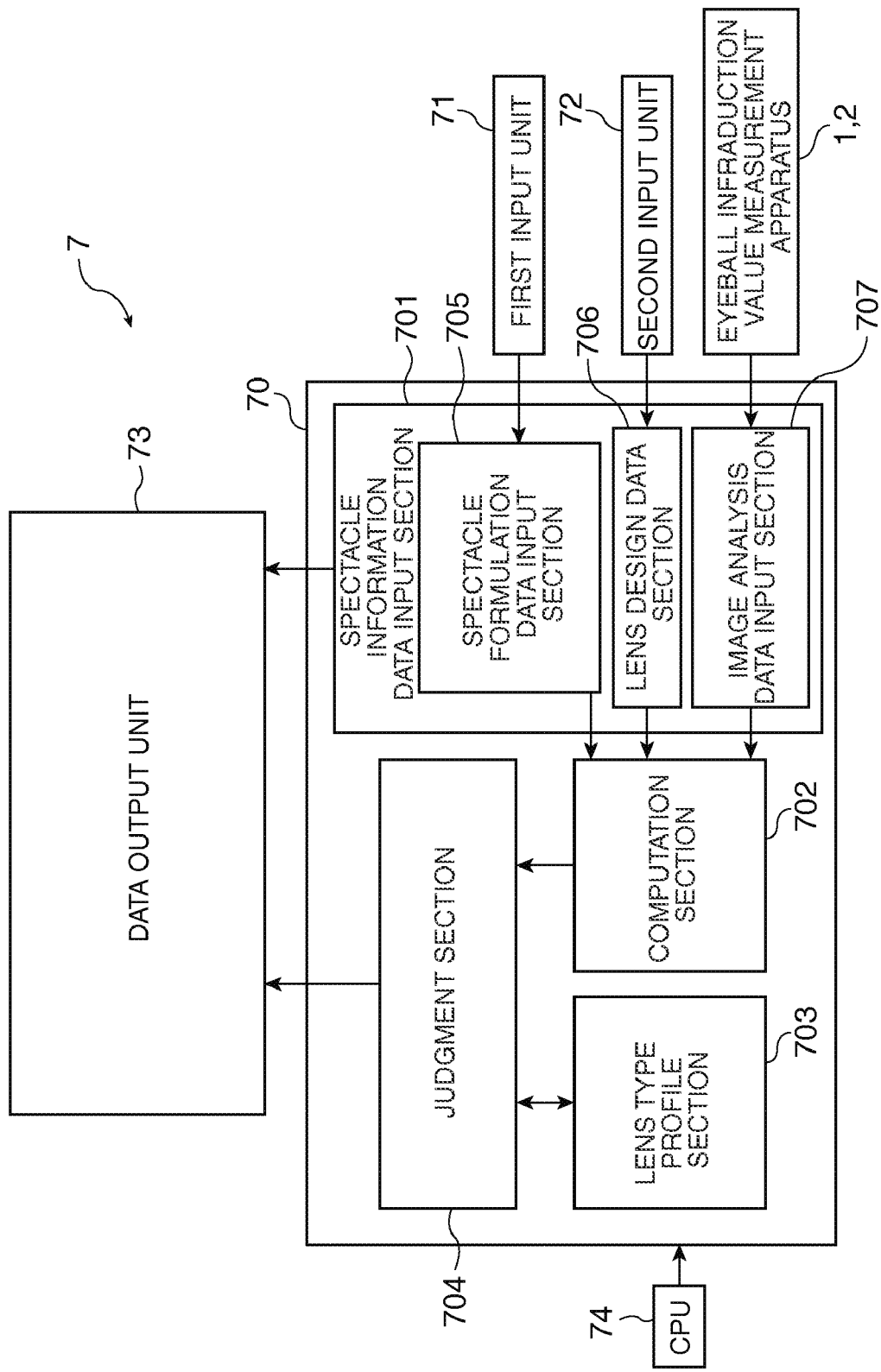
FIG. 2 is a block diagram showing an overall configuration of a spectacle lens selection system according to the embodiment.

FIG. 2 is a block diagram showing an overall configuration of a spectacle lens selection system according to the present embodiment.

In FIG. 2, the spectacle lens selection system includes an eyeball infraduction value measurement unit 1 or 2 and a selection unit 7 that selects a single spectacle lens from a plurality of types of spectacle lens based on data sent from the eyeball infraduction value measurement unit 1 or 2. The selection unit 7 includes a selection control unit 70, a first input unit 71, a second input unit 72, a data output unit 73, and a CPU 74 that controls the selection control unit 70.

The first input unit 71 is an input unit formed of a keyboard, a pen, and other components and used to input information directly to the selection unit 7.

The second input unit 72 is a unit to which necessary information is inputted from a lens manufacturer over the Internet, a telephone line, or any other communication line.

The eyeball infraduction value measurement unit 1 or 2 measures the eyeball infraduction value Indih, which is the length from the distance eyepoint FP to the reading eyepoint NP. In the present embodiment, FIGS. 3A and 3B, 4A to 4C, 5A to 5C, 6, 7, and 8 show the configuration of the eyeball infraduction value measurement unit 1 as an example of the eyeball infraduction value measurement unit, and FIGS. 9A and 9B, 10A to 10C, and 11A to 11C show a key portion of the eyeball infraduction value measurement unit 2 as an example of the eyeball infraduction value measurement unit.

Figure 3A:
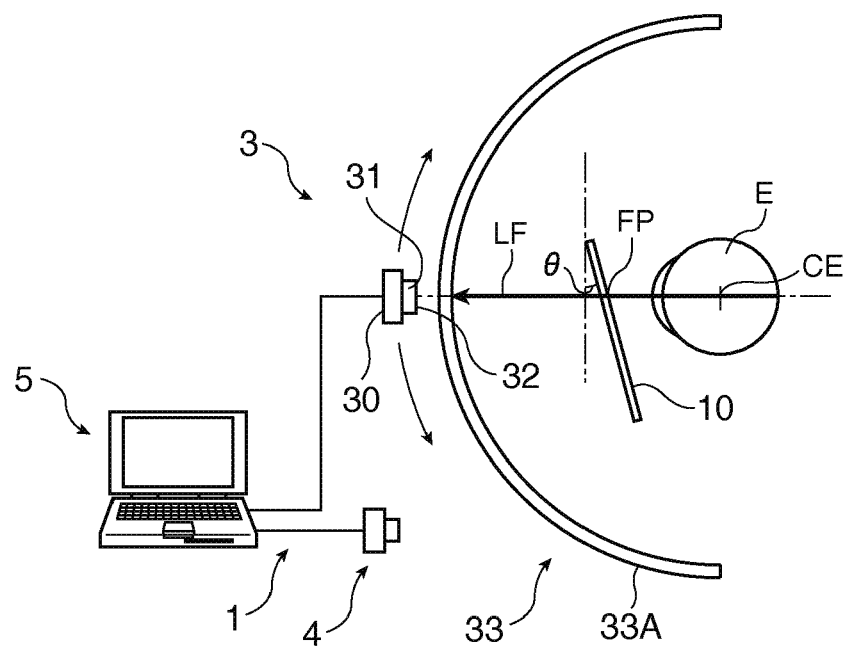
FIGS. 3A and 3B are schematic configuration diagrams of an eyeball infraduction value measurement unit according to the embodiment.
Figure 3B:
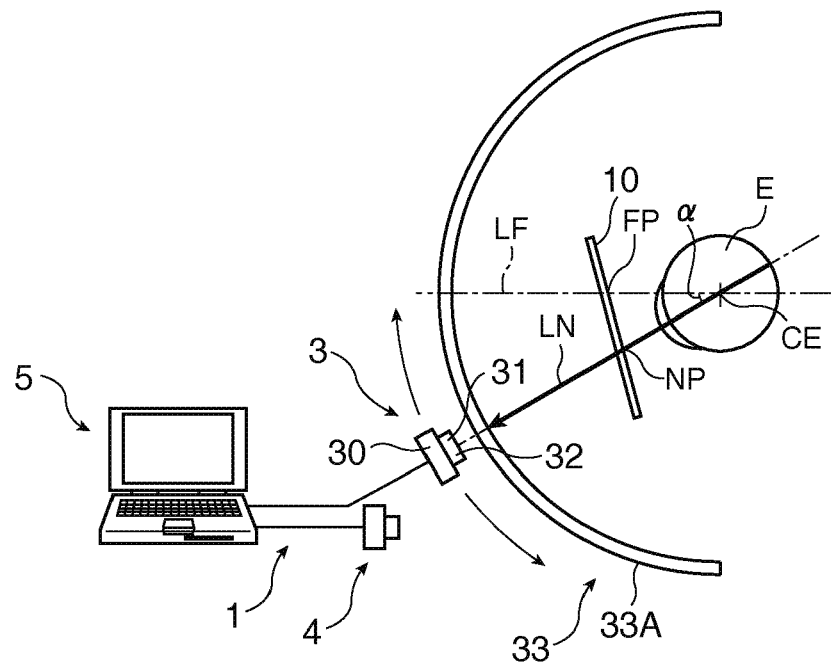

FIGS. 3A and 3B are schematic configuration diagrams of the eyeball infraduction value measurement unit 1.

In FIGS. 3A and 3B, the eyeball infraduction value measurement unit 1 includes a sight line position detecting unit 3 that detects the position of the line of sight of a wearer, a side image capturing unit 4 that measures a forward inclination angle θ of the frame that holds the spectacle lens 10, and a length calculating unit 5 that computes the eyeball infraduction value Indih based on outputs from the sight line position detecting unit 3 and the side image capturing unit 4.

The sight line position detecting unit 3, which detects the position of the line of sight of the wearer that corresponds to the distance eyepoint FP and the position of the line of sight of the wearer that corresponds to the reading eyepoint NP, includes a light irradiation section 31 that irradiates an eyeball E of the wearer with light, a front image capturing section 32 that captures a front image containing the light emitted from the light irradiation section 31 and reflected off the eyeball E of the wearer, and a moving mechanism 33 that moves the light irradiation section 31 and the front image capturing section 32. The light irradiation section 31 and the front image capturing section 32 are accommodated in a common housing 30, and the housing 30 is connected to the moving mechanism 33, which pivots around the center of the eyeball E.

The light irradiation section 31 is formed of a near-infrared LED.

The front image capturing section 32 captures light reflected off the retina of the eyeball E of the wearer and passing through the pupil of the eyeball E with a camera and detects the position of the pupil based on the captured, retina reflection data processed in an image processor.

FIG. 3A shows a state in which an image for detecting the position of the distance eyepoint is captured. In FIG. 3A, when the wearer faces forward and a forward line of sight LF of the wearer passes through the distance eyepoint FP, the front image capturing section 32 detects the position of the pupil.

To detect the position of the pupil, the image processor assumes that the portion of the image that represents the pupil is an ellipse, calculates the center of the ellipse based on the condition under which inscribed parallelograms can be drawn in the ellipse, determine contour points where straight lines passing through the center of the ellipse intersect the pupil portion, removes the contour points, and determines ellipse parameters after the removal by using a method of least squares.

Figure 4A:
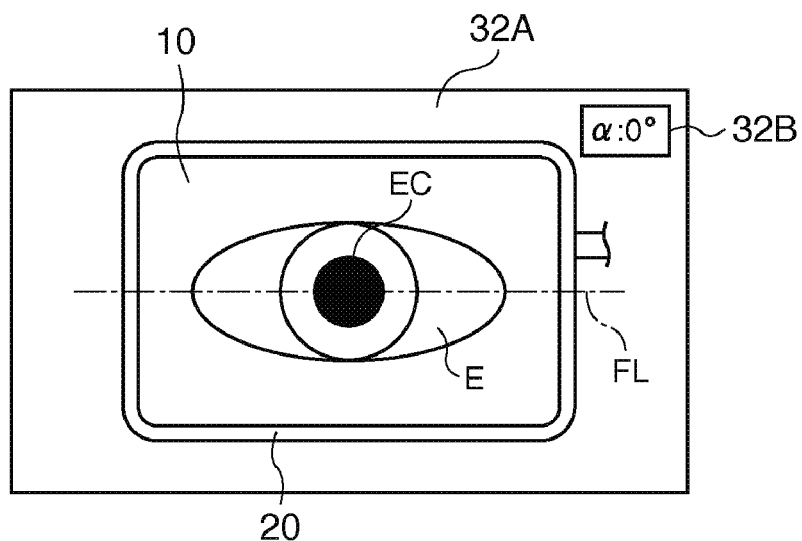
FIGS. 4A to 4C are schematic views of images of a person wearing spectacles captured with a front image capturing section.
Figure 4B:
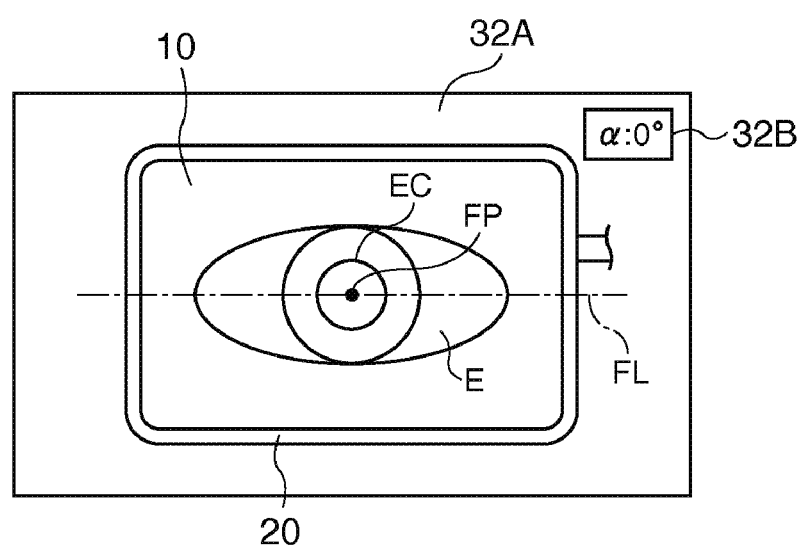
Figure 4C:
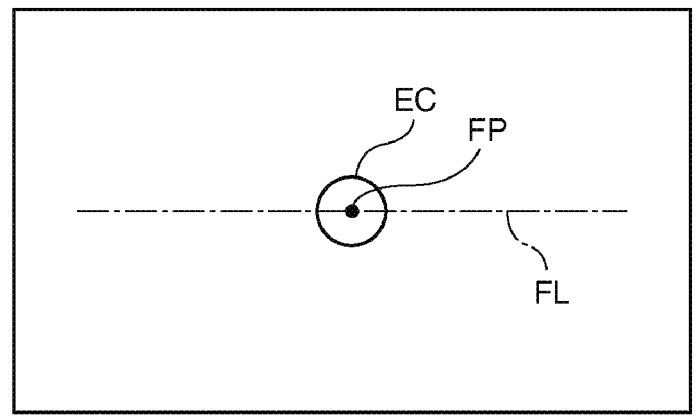

FIGS. 4A to 4C specifically show a method for detecting the position of the pupil. FIGS. 4A to 4C are schematic views of images 32A of a person wearing spectacles captured with the front image capturing section 32. Each image 32A is displayed on a display of the length calculating unit 5, which will be described later.

In FIGS. 4A and 4B, the images 32A show the spectacle lens 10 and the eyeball E of the wearer. Each image 32A showing the eyeball E has an angle display field 32B in an upper right portion thereof. The angle display field 32B displays the angle of a vertical plane containing the front image capturing section 32 around the eyeball E of the wearer in degrees [°]. The angle is 0° in FIGS. 4A and 4B because the wearer faces forward (looks in the horizontal direction).

The front image capturing section 32 first captures an image of the wearer with the light irradiation section 31 turned off, as shown in FIG. 4A. In FIG. 4A, a pupil portion EC of the eyeball E is displayed in black in the captured image because the image was captured in the same manner as a typical camera captures an image. In this state, when the light irradiation section 31 irradiates the eyeball E with light, the color of the pupil portion EC changes in an image captured with the front image capturing section 32, as shown in FIG. 4B. Specifically, the color of the pupil portion EC changes from black to red, which is a phenomenon called a red eye. The image shown in FIG. 4A is subtracted from the image shown in FIG. 4B so that only the pupil portion EC is left, as shown in FIG. 4C. The position of the pupil portion EC is then detected in accordance with the method described above.

FIG. 3B is a schematic view showing a state in which an image for detecting the position of the reading eyepoint is captured. In FIG. 3B, when the wearer faces downward and the line of sight of the wearer passes through the reading eyepoint, the front image capturing section 32 detects the position of the pupil.

Figure 5A:
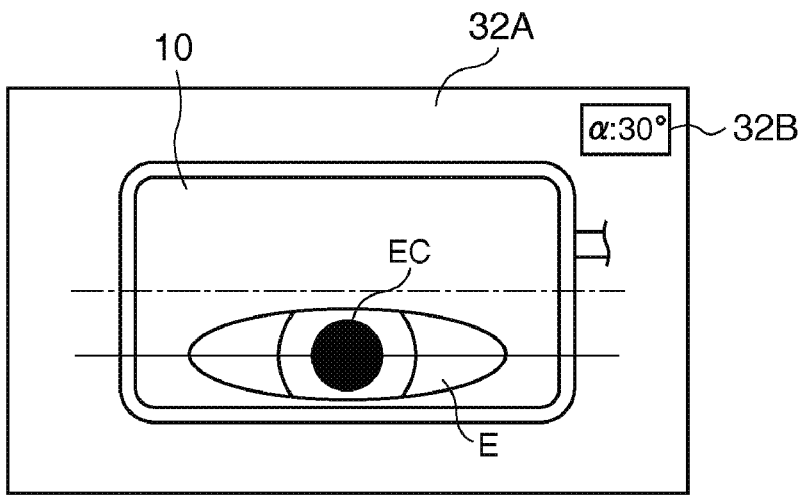
FIGS. 5A to 5C are schematic views of images of the person wearing the spectacles captured with the front image capturing section.
Figure 5B:
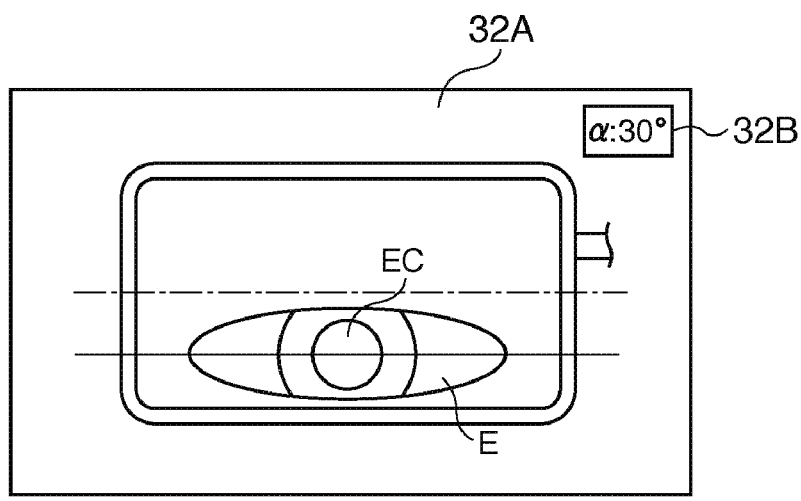
Figure 5C:
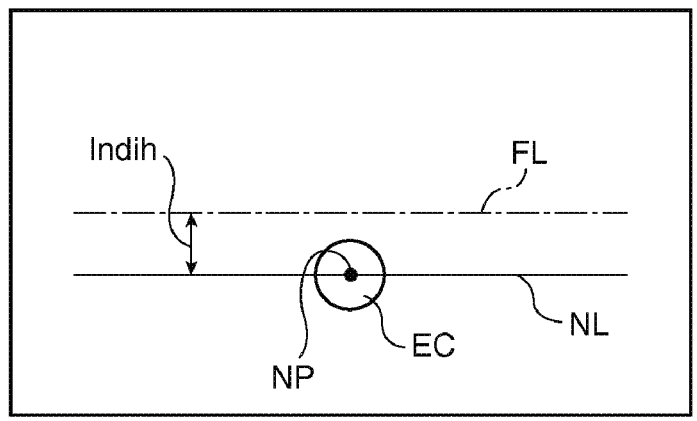

FIGS. 5A to 5C are schematic views of images 32A of the person wearing the spectacles captured with the front image capturing section 32. Since the wearer faces downward in FIGS. 5A to 5C, the eye of the wearer in the captured image is drawn flatter than the eye in FIGS. 4A to 4C.

In FIGS. 5A to 5C, the images 32A show the spectacle lens 10 and the eyeball E of the wearer. Each image 32A has the angle display field 32B in the upper right portion thereof. In FIGS. 5A and 5B, the angle is greater than 0° because the wearer directs the line of sight toward the reading eyepoint (looks in a downward oblique direction). Specifically, the displayed angle is 30° in FIGS. 5A and 5B.

The front image capturing section 32 first captures an image of the wearer with the light irradiation section 31 turned off, as shown in FIG. 5A. In FIG. 5A, the pupil portion EC of the eyeball E is displayed in black in the captured image. In this state, when the light irradiation section 31 irradiates the eyeball E with light, the color of the pupil portion EC changes (to red) in an image captured with the front image capturing section 32, as shown in FIG. 5B. The image shown in FIG. 5A is subtracted from the image shown in FIG. 5B so that only the pupil portion EC is left, as shown in FIG. 5C. The position of the pupil portion EC is then detected in accordance with the method described above.

In FIGS. 3A and 3B, the moving mechanism 33 includes an arcuate dome 33A and a drive section (not shown) that drives the housing 30, which accommodates the light irradiation section 31 and the front image capturing section 32, along the dome 33A. The drive section includes a motor, a gear mechanism, and a chain, as appropriate.

The side image capturing unit 4, which functions as a forward inclination angle measuring unit, includes a camera that captures an image of a side of the person wearing the spectacles that holds the spectacle lens 10 and an image processor that determines the forward inclination angle θ of the frame 20 based on the image captured with the camera.

Figure 6:
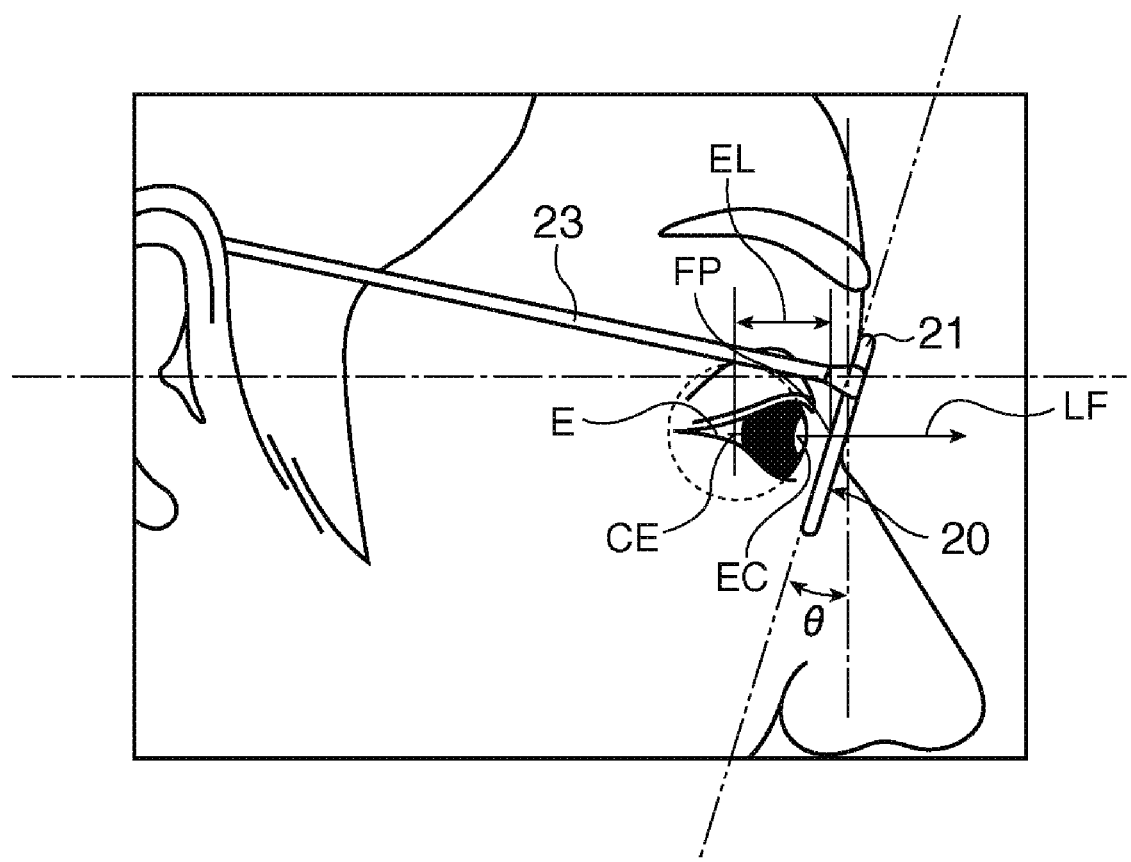
FIG. 6 is a schematic view of an image captured with a side image capturing unit.

FIG. 6 shows an image captured with the side image capturing unit 4, in which the wearer faces in the horizontal direction. The image processor calculates the forward inclination angle θ based on the positions of the temple 23 and the frame rim 21 of the frame 20 worn by the wearer and other information in the image. The data on the forward inclination angle θ calculated by the image processor is sent to the length calculating unit 5. In the present embodiment, the image processor may be omitted and an operator may look at the screen displaying the image captured with the camera, directly determine the forward inclination angle θ, and separately input the determined value to the length calculating unit 5.

In FIGS. 3A and 3B, the length calculating unit 5 is a personal computer including a keyboard or any other external input section, a display section, and a computation section and computes the eyeball infraduction value Indih based on the information outputted from the front image capturing section 32 and the side image capturing unit 4 and other information.

The eyeball infraduction value Indih is the distance (length) between the distance eyepoint line FL and the reading eyepoint line NL. In the present embodiment, the eyeball infraduction value Indih is computed in 0.5-mm steps.

Figure 7:
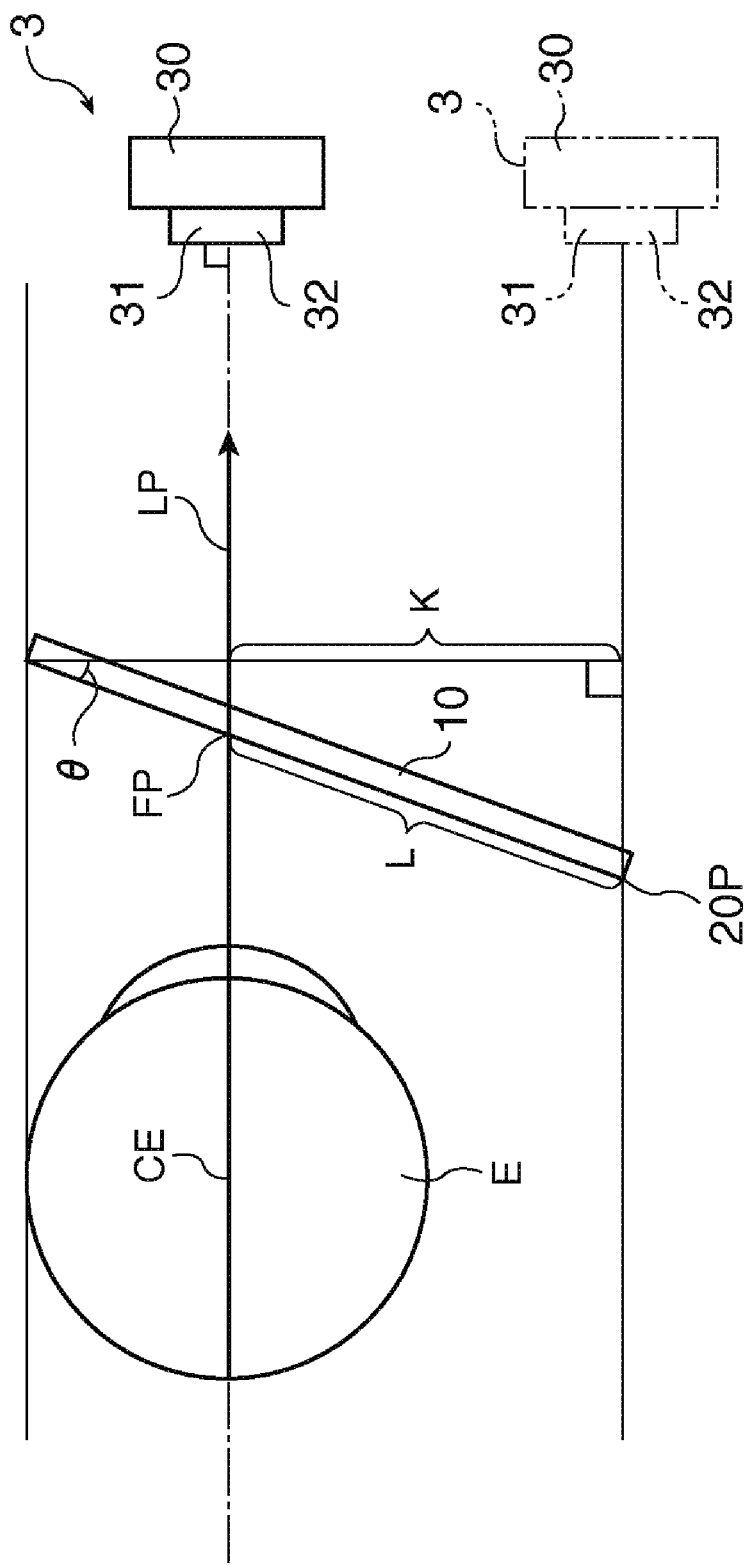
FIG. 7 is a schematic view for describing how to determine the length to a distance eyepoint.
Figure 8:
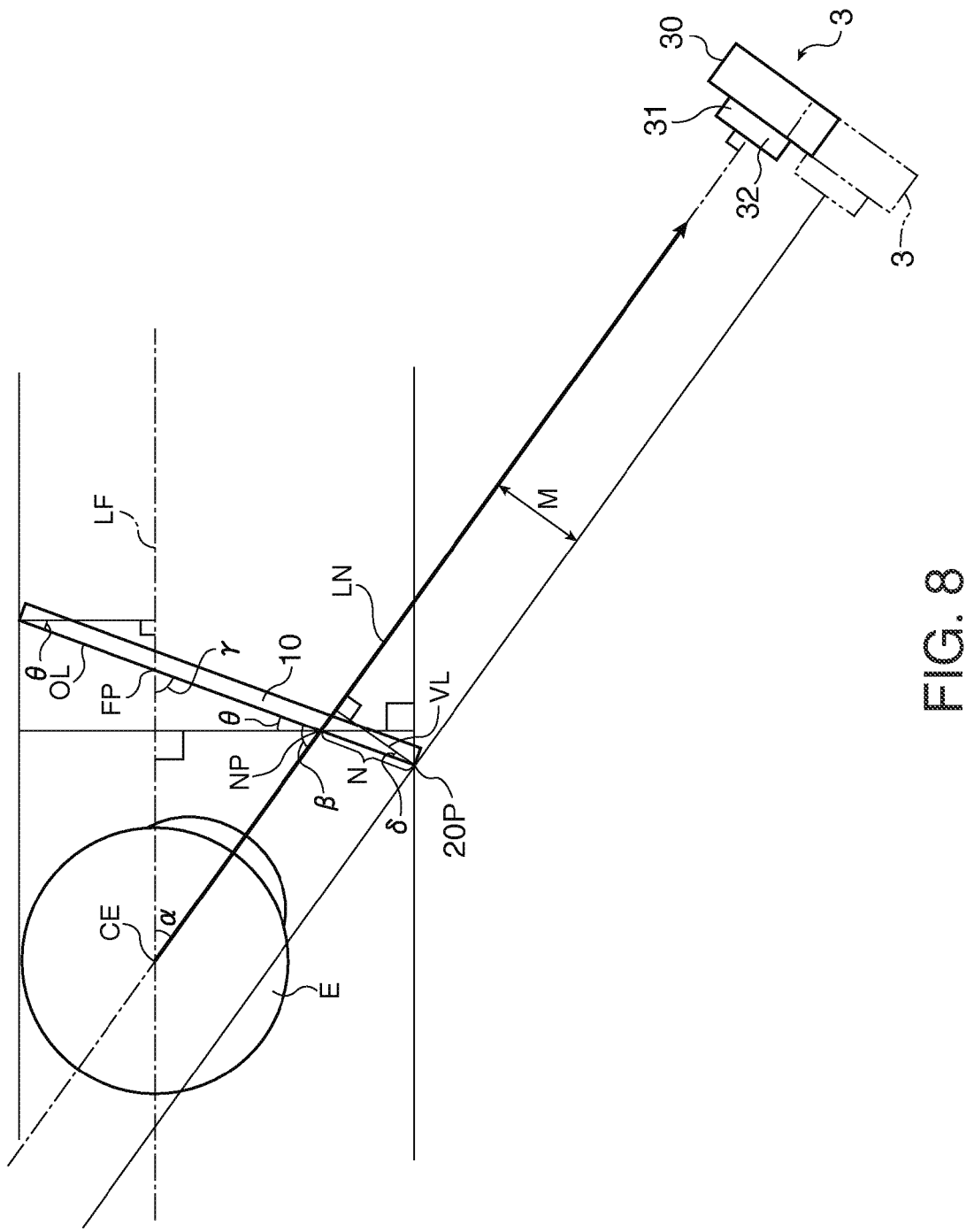
FIG. 8 is a schematic view for describing how to determine the length to a reading eyepoint.

FIG. 7 is a schematic view for describing how to determine the length to the distance eyepoint, and FIG. 8 is a schematic view for describing how to determine the length to the reading eyepoint.

As shown in FIGS. 7 and 8, a length N to the reading eyepoint, which is the length from the position of a lower end 20P on the eyeball-side surface of the frame 20 to the reading eyepoint NP, is determined from Equations (a) to (d) described below based on the forward inclination angle θ inputted from the side image capturing unit 4, the forward line of sight LF, determined by the front image capturing section 32, which connects the center of the eyeball to the distance eyepoint FP, a downward line of sight LN connecting the center of the eyeball to the reading eyepoint NP, an eyeball infraduction angle α between the forward line of sight LF and the downward line of sight LN, an angle β between the downward line of sight LN and an eyeball-side surface OL of the spectacle lens, an angle γ between the eyeball-side surface OL of the spectacle lens and the forward line of sight LF, an angle δ between the eyeball-side surface OL of the spectacle lens and a normal VL dropped from the position of the lower end 20P to the downward line of sight LN, a distance K between the eyeball-side position of the lower end 20P of the frame 20 and the forward line of sight LF, and a length M of the normal VL dropped from the eyeball-side position of the lower end 20P to the downward line of sight LN. The distance K is also an apparent length between the distance eyepoint FP and the lower end 20P of the spectacle lens 10, and the length M is also an apparent length between the reading eyepoint NP and the lower end 20P of the spectacle lens 10.

$$N = M/\cos \delta \quad (a)$$

$$\delta = 180° - (\beta + 90°) \quad (b)$$

$$\beta = 180° - (\alpha + \gamma) \quad (c)$$

$$\gamma = 180° - (90° + \theta) \quad (d)$$

A length L to the distance eyepoint, which is the length from the lower end 20P on the eyeball-side surface of the frame 20 to the distance eyepoint FP, can be determined from the following Equation (e).

$$L = K/\cos \theta \quad (e)$$

Further, the eyeball infraduction value Indih, which is the distance between the distance eyepoint FP and the reading eyepoint NP, can be determined from the following Equation (f).

$$Indih = L - N \quad (f)$$

In the present embodiment, Equations described above are stored in a memory in the length calculating unit 5.

The distance K between the eyeball-side position of the lower end 20P of the frame 20 and the forward line of sight LF can be determined as a travel of the front image capturing section 32 moved from the position where the forward line of sight LF is detected at the center of the front image capturing section 32 to the position where the lower end 20P is detected at the center of the front image capturing section 32. Similarly, the length M between the eyeball-side position of the lower end 20P and the downward line of sight LN can be determined as a travel of the front image capturing section 32 moved from the position where the downward line of sight LN is detected at the center of the front image capturing section 32 to the position where the lower end 20P is detected at the center of the front image capturing section 32. Although the front image capturing section 32 travels along an arcuate path, the actual travel is shorter than the distance between the eyeball and the front image capturing section 32, whereby the arcuate travel can be approximated to translational travel.

The eyeball infraduction value measurement unit 2 will be described with reference to FIGS. 9A and 9B, 10A to 10C, and 11A to 11C. The eyeball infraduction value measurement unit 2 is similar to the eyeball infraduction value measurement unit 1 but differs therefrom only in terms of the configuration of the front image capturing section.

Figure 9A:
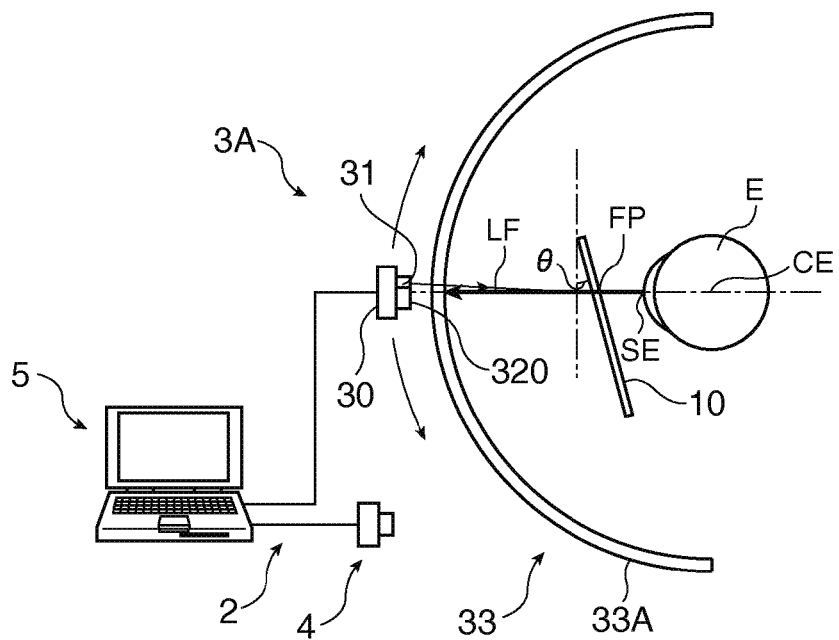
FIGS. 9A and 9B are schematic configuration diagrams of an eyeball infraduction value measurement unit different from the unit shown in FIGS. 3A and 3B.
Figure 9B:
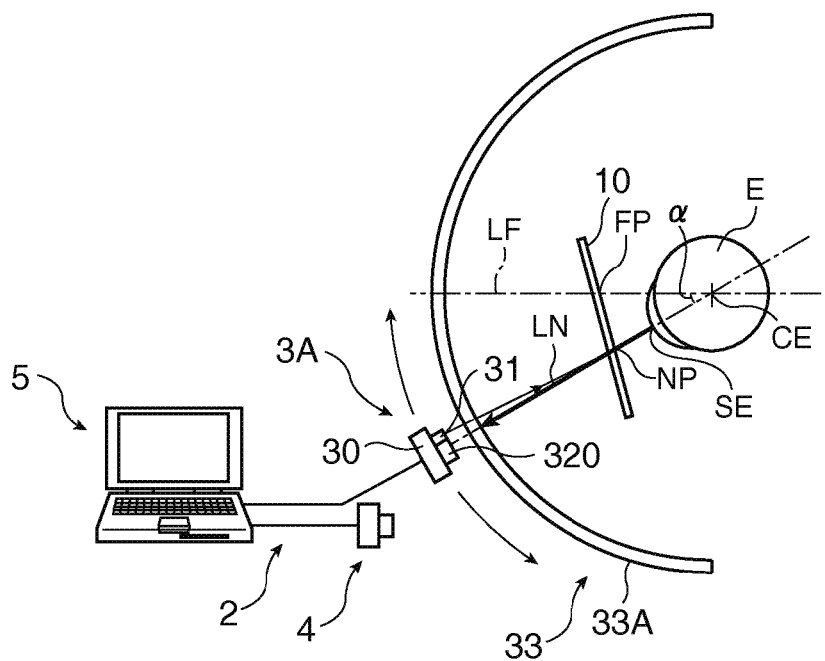
Figure 10A:
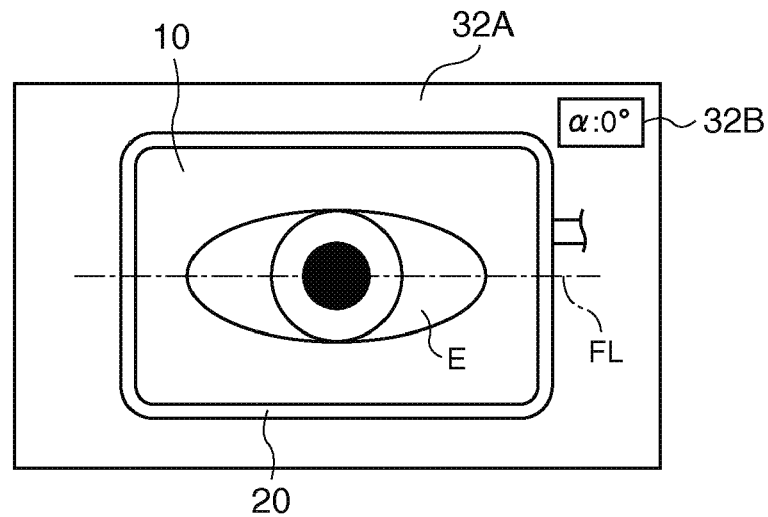
FIGS. 10A to 10C are schematic views of images of a person wearing spectacles captured with a front image capturing section.
Figure 10B:
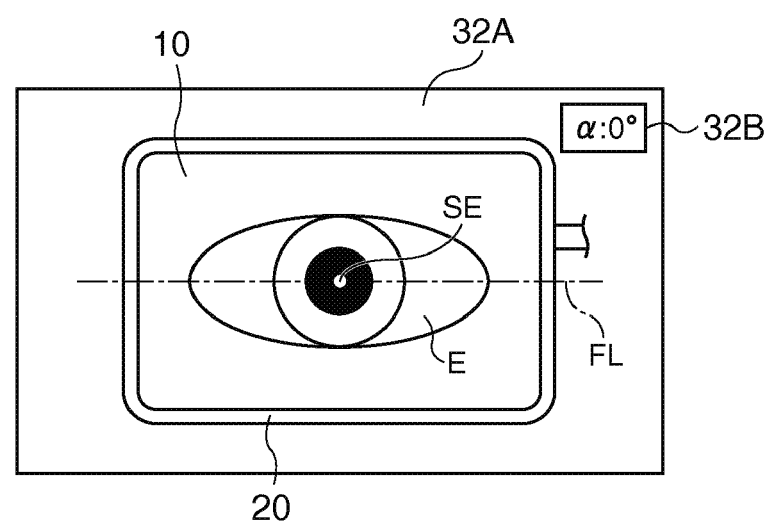
Figure 10C:
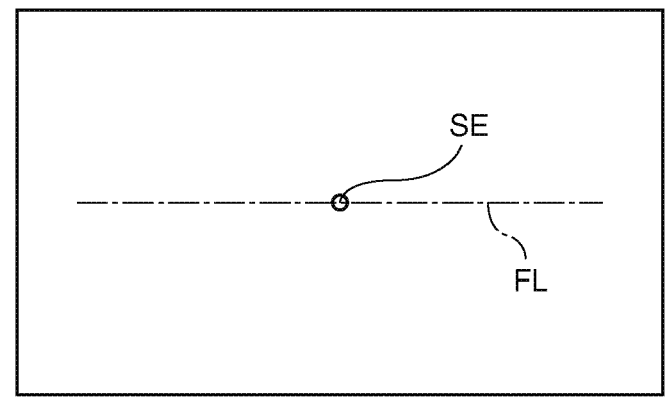
Figure 11A:
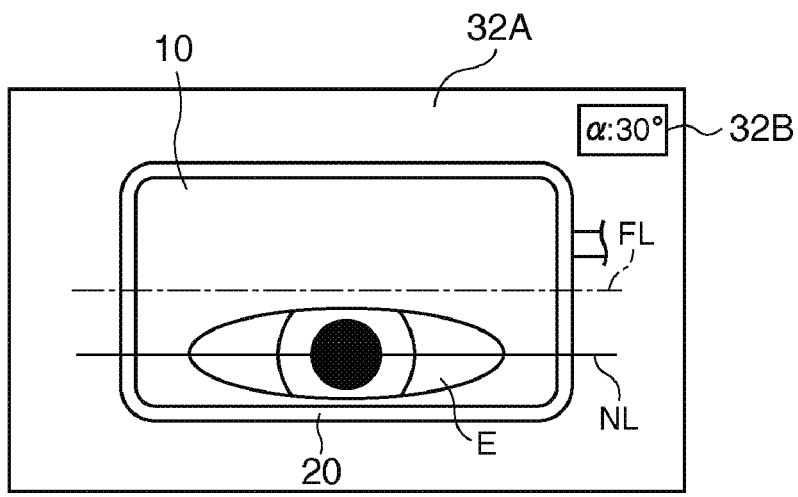
FIGS. 11A to 11C are schematic views of images of the person wearing the spectacles captured with the front image capturing section.
Figure 11B:
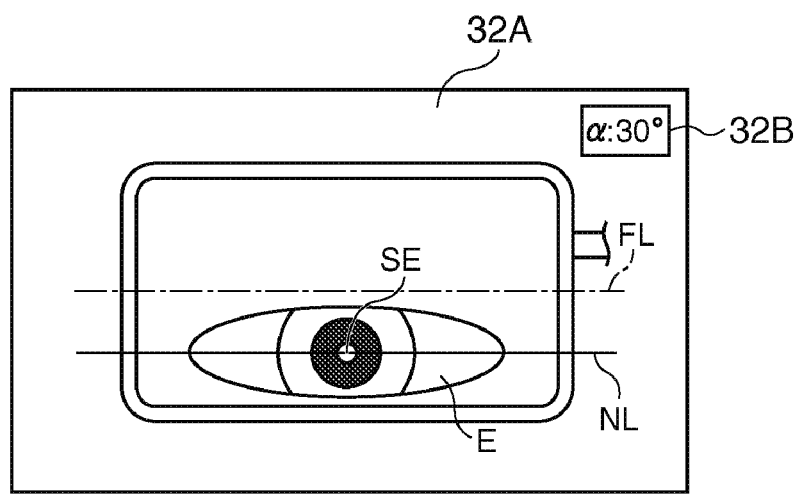
Figure 11C:
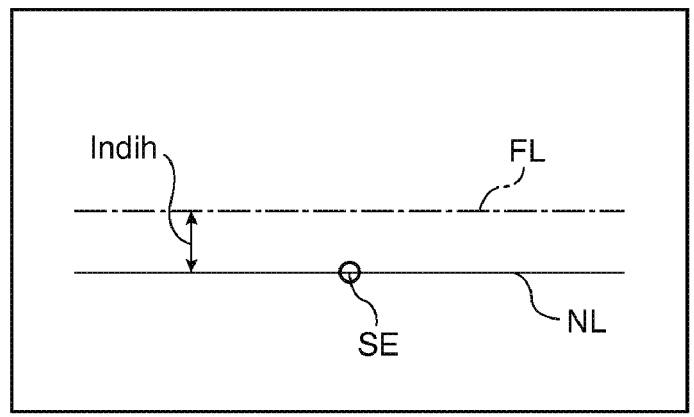

FIGS. 9A and 9B are schematic configuration diagrams of the eyeball infraduction value measurement unit 2 and correspond to FIGS. 3A and 3B. FIGS. 10A to 10C are schematic views of images of a person wearing spectacles captured with a front image capturing section in the eyeball infraduction value measurement unit 2 and correspond to FIGS. 4A to 4C. FIGS. 11A to 11C are schematic views of images of the person wearing the spectacles captured with the front image capturing section in the eyeball infraduction value measurement unit 2 when the line of sight of the wearer passes through the reading eyepoint and correspond to FIGS. 5A to 5C.

In FIGS. 9A and 9B, the eyeball infraduction value measurement unit 2 includes a sight line position detecting unit 3A that detects the position of the line of sight of the wearer, a side image capturing unit 4, and a length calculating unit 5 that computes the eyeball infraduction value Indih based on outputs from the sight line position detecting unit 3A and the side image capturing unit 4.

The sight line position detecting unit 3A, which detects the position of the line of sight of the wearer that corresponds to the distance eyepoint FP and the position of the line of sight of the wearer that corresponds to the reading eyepoint NP, includes a light irradiation section 31, a front image capturing section 320 that captures a front image containing the light emitted from the light irradiation section 31 and reflected off the cornea SE of the eyeball E of the wearer, and a moving mechanism 33 that moves the light irradiation section 31 and the front image capturing section 320.

The front image capturing section 320 captures light reflected off the cornea SE of the eyeball E of the wearer with a camera and detects the reflection point on the cornea SE in an image processor based on the captured image data. To detect the reflection point on the cornea SE, the image processor performs the same signal processing as that of the image processor in the eyeball infraduction value measurement unit 1.

FIG. 10A shows a state in which an image for detecting the position of the distance eyepoint is captured.

The front image capturing section 320 first captures an image of the wearer with the light irradiation section 31 turned off, as shown in FIG. 10A. In FIG. 10A, the cornea SE of the eyeball E is displayed in black in the captured image because the image was captured in the same manner as a typical camera captures an image. In this state, when the light irradiation section 31 irradiates the eyeball E with light, the color of the reflection point on the cornea SE changes in an image captured with the front image capturing section 320, as shown in FIG. 10B. The image shown in FIG. 10A is subtracted from the image shown in FIG. 10B so that only the reflection point of the retinal SE is left, as shown in FIG. 10C. The position of the reflection point on the cornea SE is then detected in accordance with the method described above.

FIG. 9B is a schematic view showing a state in which an image for detecting the position of the reading eyepoint is captured. FIGS. 11A to 11C show images captured at the position shown in FIG. 9B.

The front image capturing section 320 first captures an image of the wearer with the light irradiation section 31 turned off, as shown in FIG. 11A. In FIG. 11A, the reflection point on the cornea SE of the eyeball E is displayed in black in the captured image. In this state, when the light irradiation section 31 irradiates the eyeball E with light, the color of the reflection point on the cornea SE changes in an image captured with the front image capturing section 320, as shown in FIG. 11B. The image shown in FIG. 11A is subtracted from the image shown in FIG. 11B so that only the reflection point on the retinal SE is left, as shown in FIG. 11C. The position of the reflection point on the cornea SE is then detected in accordance with the method described above.

In the eyeball infraduction value measurement unit 2, the eyeball infraduction value Indih is determined from the difference between the length L to the distance eyepoint FP and the length N to the reading eyepoint NP, as in the eyeball infraduction value measurement unit 1. That is, the eyeball infraduction value Indih is determined from Equation (f) described above. The length L to the distance eyepoint FP and the length N to the reading eyepoint NP are determined from Equations (a) to (e) described above.

Figure 12:
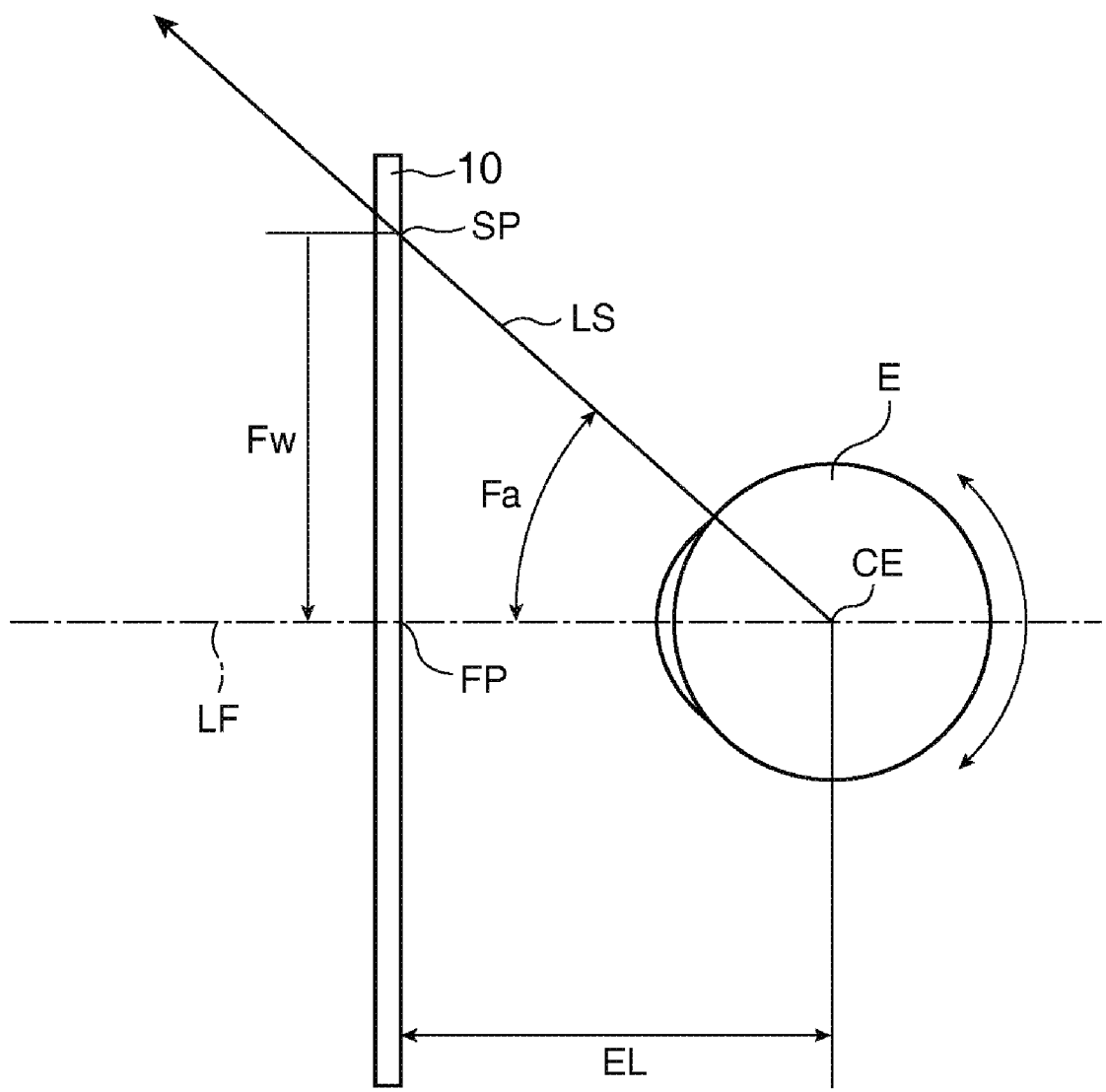
FIG. 12 is a schematic view showing the relationship between a horizontal fixation viewing angle and a spectacle fitting distance.

FIG. 12 is a schematic view showing the relationship between a horizontal fixation viewing angle and a spectacle fitting distance. In FIG. 12, the horizontal fixation field width Fw is the length of a line segment not only extending in the horizontal direction from the distance eyepoint FP of the actually worn spectacle lens 10 but also representing the range within which the wearer can view objects without changing the head orientation. That is, the horizontal fixation field width Fw is the distance along the distance eyepoint line FL on the eyeball-side surface of the spectacle lens 10 from the distance eyepoint FP, which is the intersection of a line extending upward in the vertical direction from the geometric center of the spectacle lens 10 and the distance eyepoint line FL, to a position SP visible to the wearer when the wearer shifts the line of sight sideways from the distance eyepoint FP without turning the head.

Now, let a horizontal fixation viewing angle Fa be the angle between the forward line of sight LF passing through the distance eyepoint FP and a line LS connecting the eyeball center CE to the position SP, and a spectacle fitting distance EL be the distance between the distance eyepoint FP and the eyeball center CE. The horizontal fixation field width Fw can be determined by the following equation.

$$Fw = EL \times \tan Fa \quad (g)$$

The side image capturing unit 4 also functions as a horizontal fixation field width determination unit that determines the horizontal fixation field width Fw, as shown in FIG. 6.

The image processor in the side image capturing unit 4 estimates the position of the eyeball center CE of the wearer, for example, from the size of the eyeball E based on an image captured with the camera, measures the spectacle fitting distance EL, which is the distance between the eyeball center CE and the distance eyepoint FP, based on the image, and calculates the horizontal fixation field width Fw from Equation (g) based on the spectacle fitting distance EL and the horizontal fixation viewing angle Fa, which has been inputted in advance. The data on the horizontal fixation field width Fw calculated by the image processor is sent to the length calculating unit 5. In the present embodiment, the image processor may be omitted, but the operator may look at the screen displaying the image captured with the camera, directly determine the spectacle fitting distance EL, and separately input the thus determined value to the length calculating unit 5, where the horizontal fixation field width Fw is calculated.

In the present embodiment, the horizontal fixation viewing angle Fa is a value determined by referring to known data. The horizontal field of view covered only with an eyeball is 20° or smaller, although slightly varying from person to person, and the field of view wider than this range is viewed by turning the head (see "Binocular vision function and spectacles," Toyohiko Hatada, Science of Spectacles, Vol. 1, pp. 35-38, 1977, The Japanese Society of Ophthalmological Optics).

Figure 13A:
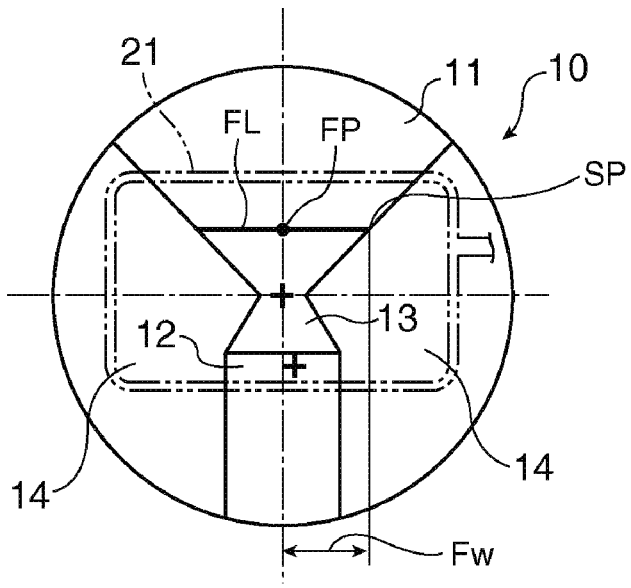
FIGS. 13A to 13C are schematic views showing three types of spectacle lens having narrow distance portions and different horizontal fixation field widths.
Figure 13B:
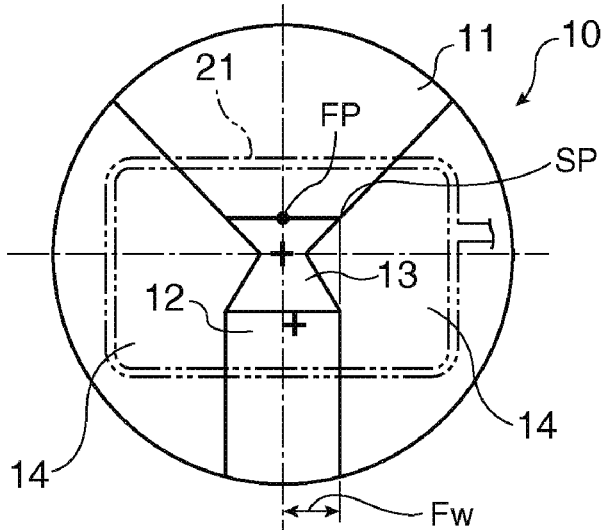
Figure 13C:
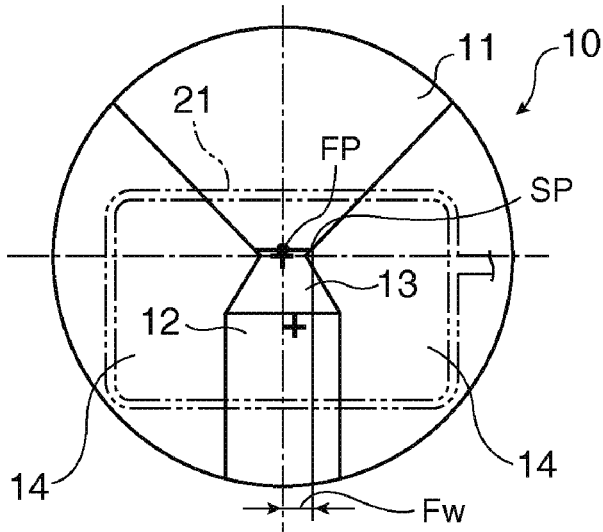

FIGS. 13A to 13C show three types of spectacle lens 10 having narrow distance portions 11 and different horizontal fixation field widths Fw.

FIG. 13A shows the horizontal fixation field width Fw of a spectacle lens 10 mainly for reading and distance vision. A spectacle lens 10 mainly for reading and distance vision is used to view both distant scenery and near documents. The spectacle lens 10 shown in FIG. 13A, for example, has a horizontal fixation viewing angle Fa greater than 13° ($13° < Fa$) and a horizontal fixation field width Fw greater than 6 mm ($6 \text{ mm} < Fw$).

FIG. 13B shows the horizontal fixation field width Fw of a spectacle lens 10 mainly for reading and intermediate vision. A spectacle lens 10 mainly for reading and intermediate vision is used to view both intermediate-range scenery and near documents. The spectacle lens 10 shown in FIG. 13B, for example, has a horizontal fixation viewing angle Fa greater than 10° but smaller than or equal to 13° ($10° < Fa \leq 13°$) and a horizontal fixation field width Fw greater than 4.5 mm but smaller than or equal to 6 mm ($4.5 \text{ mm} < Fw \leq 6 \text{ mm}$).

FIG. 13C shows the horizontal fixation field width Fw of a spectacle lens 10 mainly for reading and reading vision. A spectacle lens 10 mainly for reading and reading vision is used to view both documents on a desk and documents closer to the wearer, which are both in near positions. The spectacle lens 10 shown in FIG. 13C, for example, has a horizontal fixation viewing angle Fa greater than 8.5° but smaller than or equal to 10° ($8.5° < Fa \leq 10°$) and a horizontal fixation field width Fw greater than 3.75 mm but smaller than or equal to 4.5 mm ($3.75 \text{ mm} < Fw \leq 4.5 \text{ mm}$).

As shown in FIGS. 13A to 13C, the spectacle lens 10 mainly for reading and distance vision shown in FIG. 13A has the longest horizontal fixation field width Fw, the spectacle lens 10 mainly for reading and reading vision shown in FIG. 13C has the shortest horizontal fixation field width Fw, and the spectacle lens 10 mainly for reading and intermediate vision shown in FIG. 13B has an intermediate horizontal fixation field width Fw. The horizontal fixation field width Fw thus varies depending on the type of the spectacle lens 10. In the present embodiment, the horizontal fixation viewing angle Fa is, for example, greater than or equal to 13° for the spectacle lens 10 mainly for reading and distance vision, and greater than 0° but smaller than 13° for the spectacle lenses 10 mainly for reading and intermediate vision and reading and reading vision. The horizontal fixation viewing angle Fa in the present embodiment is set at a fixed value in each of the types of spectacle lens 10: the spectacle lens 10 mainly for reading and distance vision, the spectacle lens 10 mainly for reading and intermediate vision, and the spectacle lens 10 mainly for reading and reading vision.

In FIG. 2, the selection control unit 70 includes a spectacle information data input section 701, a computation section 702, a lens type profile section 703, and a judgment section 704.

The spectacle information data input section 701 includes a spectacle formulation data input section 705, a lens design data section 706, and an image analysis data input section 707.

The spectacle formulation data input section 705 stores usage data, optometry data, frame data, fitting data, and other data, which are inputted from the first input section 71. The data stored in the spectacle formulation data input section 705 include not only dioptric power, addition power, spherical dioptric power, astigmatic dioptric power, a cylinder axis, prismatic dioptric power of a lens, and other lens prescription data but also the distance portion eyepoint height Fh, the reading portion eyepoint height Nh, the lens portion height Bh, and the progressive corridor length SPh. Data on the distance portion eyepoint height Fh, the reading portion eyepoint height Nh, the lens portion height Bh, and the progressive corridor length SPh are inputted in 0.5-mm steps.

The lens design data section 706 stores data on prescribed lens design profile, which is inputted from the second input section 72. The prescribed lens design profile is formed of a variety of data necessary for lens design and provided from a lens manufacturer. The prescribed lens design profile also includes computational expressions used in the computation section 702.

The image analysis data input section 707 stores data on the eyeball infraduction value Indih and the spectacle fitting distance EL, forward vision image analysis data, and downward vision image analysis data, which are sent from the eyeball infraduction value measurement unit 1 or 2.

The computation section 702 performs computation described later based on data sent from the spectacle formulation data input section 705, the lens design data section 706, and the image analysis data input section 707.

That is, the computation section 702 determines $\Delta E$ from Equations (h) and (i) based on the eyeball infraduction value Indih, the distance portion eyepoint height Fh, the progressive corridor length SPh, and the reading portion eyepoint height Nh, and then determines Oh from Equation (j) based on the $\Delta E$, the lens portion height Bh, the total length of the distance portion eyepoint height Fh, the progressive corridor length SPh, and the reading portion eyepoint height Nh, and the lower frame height Uh of any of the spectacle lenses described above.

$$th = Fh + SPh + Nh \quad (h)$$

$$\Delta E = Indih - th \quad (i)$$

$$Oh = Bh - (th + \Delta E + Uh) \quad (j)$$

The lens type profile section 703 receives input of basic information on three types, a type A, a type B, and a type C representing wide, intermediate, and narrow distance portions 11 respectively, for each of the types of spectacle lens 10, the spectacle lens 10 mainly for reading and distance vision, the spectacle lens 10 mainly for reading and intermediate vision, and the spectacle lens 10 mainly for reading and reading vision. The basic information is inputted, for example, from the first input section 71 or the second input section 72.

Figure 14A:
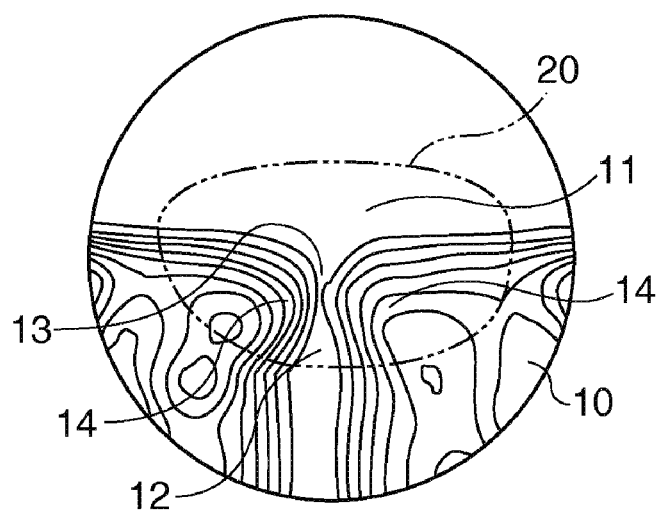
FIG. 14A is an aberration diagram showing aberrations induced in a type-A spectacle lens having a wide distance portion.
Figure 14B:
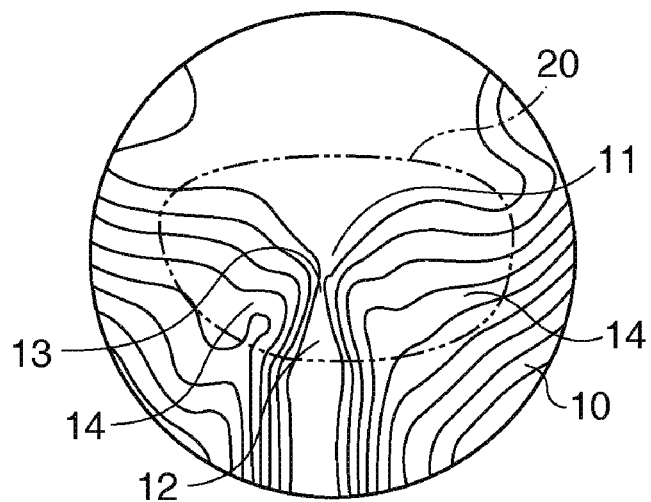
FIG. 14B is an aberration diagram showing aberrations induced in a type-B spectacle lens having an intermediate distance portion.
Figure 14C:
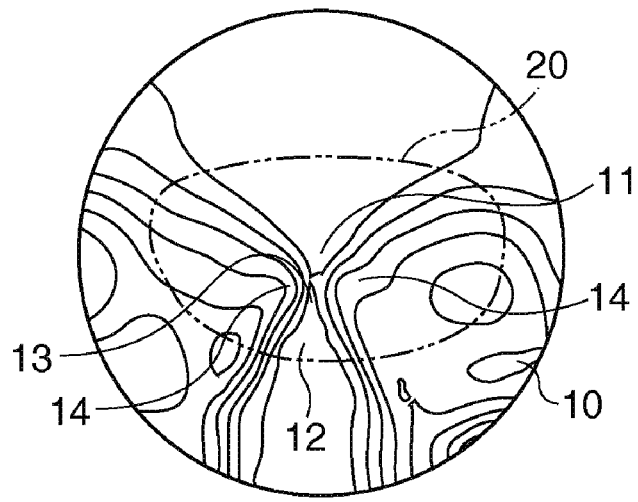
FIG. 14C is an aberration diagram showing aberrations induced in a type-C spectacle lens having a narrow distance portion.

FIGS. 14A to 14C are aberration diagrams showing aberrations induced in the spectacle lenses 10 of the types A to C. FIG. 14A shows aberrations induced in the spectacle lens 10 of the type A. FIG. 14B shows aberrations induced in the spectacle lens 10 of the type B. FIG. 14C shows aberrations induced in the spectacle lens 10 of the type C.

The type-A spectacle lens 10 having a wide distance portion 11 shown in FIG. 14A, which has a large amount of aberration in the sideways portions 14, is not suitable for a wearer who uses a progressive-power spectacle lens for the first time. The type-C spectacle lens 10 having a narrow distance portion 11 shown in FIG. 14C, which has a small amount of aberration in the sideways portions 14, is suitable for a wearer who uses a progressive-power spectacle lens for the first time. The spectacle lens 10 having an intermediate distance portion 11 shown in FIG. 14B is the average of the type A and the type C.

In FIG. 2, the judgment section 704 judges based on data from the computation section 702 and the lens type profile section 703 whether or not the following conditions are satisfied: $0 \text{ mm} \leq \Delta E \leq 2$ mm and $0 \text{ mm} < Oh$ for a specific value of the distance portion eyepoint height Fh of each of the spectacle lens 10 mainly for reading and distance vision, the spectacle lens 10 mainly for reading and intermediate vision, and the spectacle lens 10 mainly for reading and reading vision. That is, for the spectacle lens 10 mainly for reading and distance vision having a horizontal fixation field width Fw greater than 6 mm, the judgment section 704 judges whether or not the conditions of $0 \text{ mm} \leq \Delta E \leq 2$ and $0 \text{ mm} < Oh$ are satisfied in each of the following cases: 4 mm<Fh, 3 mm<Fh≦4 mm, and 1 mm≦Fh≦3 mm. For the spectacle lens 10 mainly for reading and intermediate vision having a horizontal fixation field width Fw greater than 4.5 mm but smaller than or equal to 6 mm, the judgment section 704 judges whether or not the conditions of $0 \text{ mm} \leq \Delta E \leq 2$ and $0 \text{ mm} < Oh$ are satisfied in each of the following cases: 3 mm<Fh, 2.5 mm<Fh≦3 mm, and 0.8 mm≦Fh≦2.5 mm. For the spectacle lens 10 mainly for reading and reading vision having a horizontal fixation field width Fw greater than or equal to 3.75 mm but smaller than or equal to 4.5 mm, the judgment section 704 judges whether or not the conditions of $0 \text{ mm} \leq \Delta E \leq 2$ mm and $0 \text{ mm} < Oh$ are satisfied in each of the following cases: 2.5 mm<Fh, 2 mm<Fh≦2.5 mm, and 0.5 mm≦Fh≦2 mm.

A specific configuration of the judgment section 704 will be described with reference to FIG. 15.

FIG. 15 is Table 8 showing computed values provided from the computation section 702.

In FIG. 15, the leftmost field is an Fh setting field 81 in which the distance portion eyepoint height Fh is set, and the field to the right of the Fh setting field 81 is an eyeball infraduction value displaying field 82 in which the eyeball infraduction values Indih are displayed. In the eyeball infraduction value displaying field 82, the eyeball infraduction values Indih are displayed in 0.5-mm steps. The section to the right of the eyeball infraduction value displaying field 82 is a computation result display section 83. The computation result display section 83 displays computed $\Delta E$ values corresponding to the eyeball infraduction values Indih displayed in the eyeball infraduction value displaying field 82 and based on Equation (i). The uppermost row 830 in the computation result display section 83 displays standard progressive corridor lengths.

The judgment section 704 separates the computed values into those included in a usable area 83A where $\Delta E$ is greater than or equal to 0 mm and those included in an unusable area 83B where $\Delta E$ is a negative value. The usable area 83A is further divided into a border area 83C where $\Delta E$ is greater than or equal to 0 mm but smaller than or equal to 1 mm and a safe area 83D where $\Delta E$ is greater than 1 mm. In the safe area 83D, small $\Delta E$ values are preferable, and the range of 1 mm<$\Delta E$≦2 mm is defined as an optimum area 83E.

For example, when the eyeball infraduction value Indih is 18 mm, a range of values in a row 83S in the safe area 83D are usable, and the standard progressive corridor length S corresponding to "2", which is the smallest value of those in the row 83S, is 10 mm. In the column S10, a value included in the optimum area 83E is "2".

The reason why a small value is selected from values in the row 83S in the safe area 83D (value in optimum area 83E) follows.

Figure 16A:
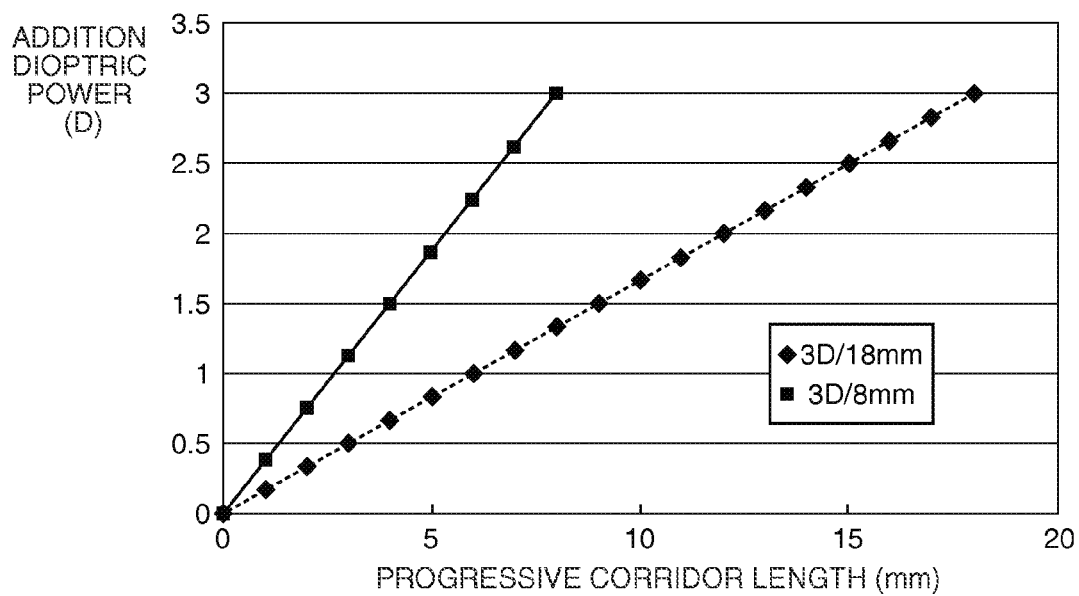
FIG. 16A shows graphs representing addition diopter characteristics of a progressive corridor.
Figure 16B:
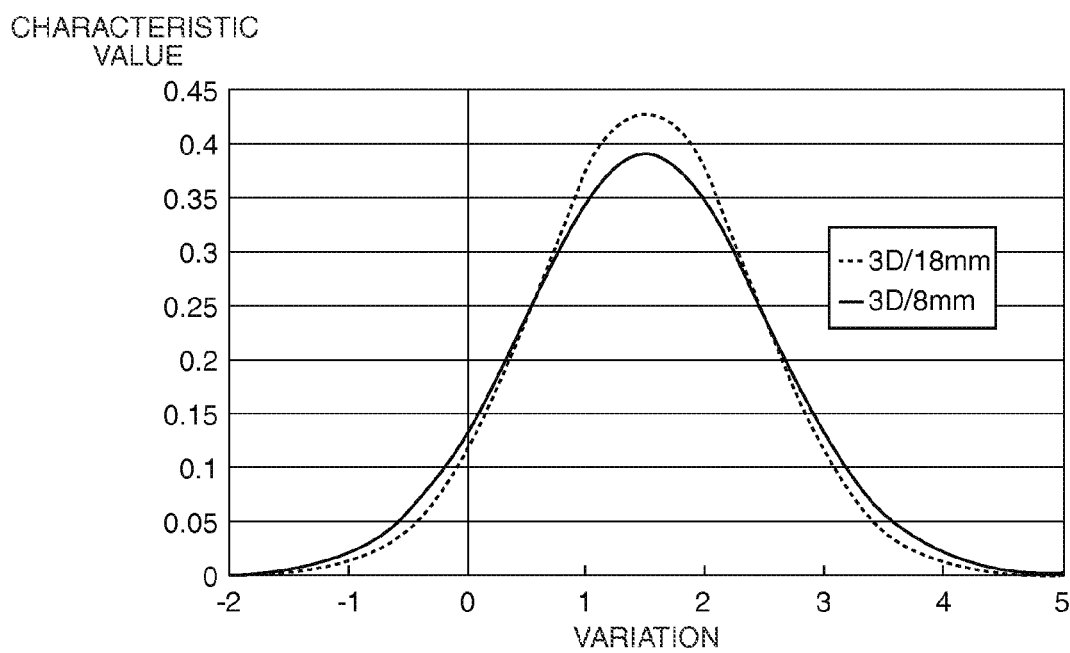
FIG. 16B shows graphs representing optical characteristics of the progressive corridor.

FIG. 16A shows graphs representing addition diopter power characteristics of the progressive corridor, and FIG. 16B shows graphs representing optical characteristics of the progressive corridor. FIG. 16A shows two cases: The addition diopter is increased by 3D by setting the progressive corridor length at 18 mm and 8 mm. FIG. 16B shows that variation in optical characteristics is smaller when the addition diopter is increased by 3D by setting the progressive corridor length at 18 mm than by setting the progressive corridor length at 8 mm. That is, FIGS. 16A and 16B show that increasing the addition diopter by a certain amount by forming a longer progressive corridor allows the wearer to view an object in a more satisfactory manner with a smaller amount of blur. Equations (h) and (i) show that a larger progressive corridor length SPh results in a smaller value of $\Delta E$, which means that a spectacle lens that allows the wearer to view an object in a more satisfactory way with a smaller amount of blur has a smaller value of $\Delta E$. In the present embodiment, when there are a plurality of candidate progressive corridor lengths, the smallest value of those in the row 83S in the safe area 83D is selected.

In the example shown in FIG. 15, the judgment section 704 uses "2", which is the smallest value in the row 83S in the safe area 83D, as the value of $\Delta E$.

Referring back to FIG. 2, the data output unit 73 receives the following information necessary to manufacture a lens from the spectacle information data input section 701 and the judgment section 704: frame data; fitting data; prescription data; the type of spectacle lens with reference to the size of the distance portion 11, that is, the type A in which the distance portion 11 is wide, the type B in which the distance portion 11 is intermediate, and the type C in which the distance portion 11 is narrow; the type of spectacle lens with reference to applications, that is, a lens mainly for reading and distance vision, a lens mainly for reading and intermediate vision, and a lens mainly for reading and reading vision; lens shaping data; and other information. Specific values of the information described above can be displayed, for example, on a display.

A spectacle lens selection method according to an embodiment of the invention will next be described with reference to FIGS. 17, 18A to 18C, 19, 20A to 20C, 21, and 22A to 22C.

A method for selecting a spectacle lens mainly for reading and distance vision will first be described with reference to FIGS. 17 and 18A to 18C. A spectacle lens mainly for reading and distance vision has a horizontal fixation field width Fw greater than 6 mm.

Figure 17:
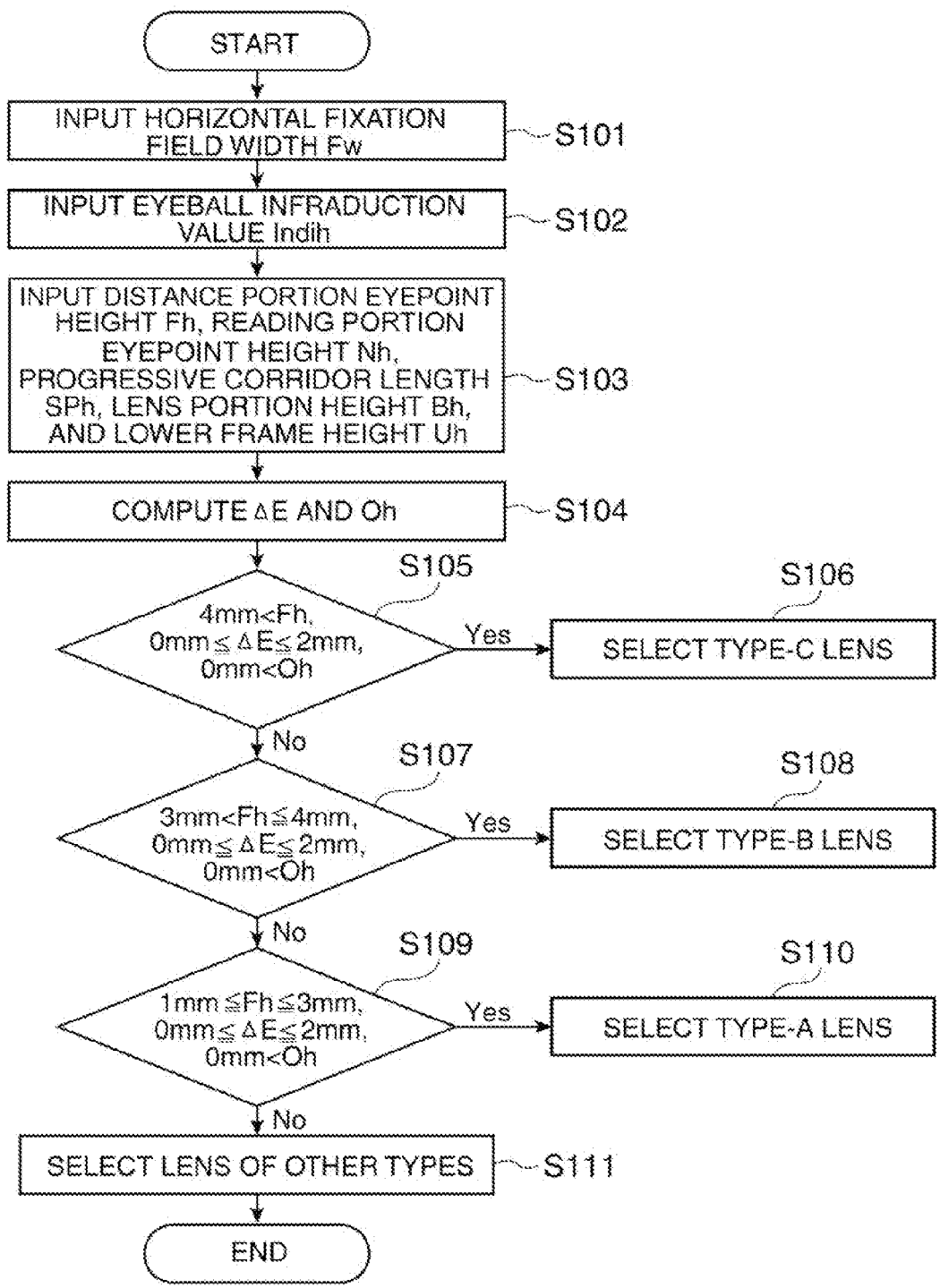
FIG. 17 is a flowchart for describing a spectacle lens selection method according to an embodiment of the invention for selecting a spectacle lens mainly for reading and distance vision.

FIG. 17 is a flowchart used to select a spectacle lens mainly for reading and distance vision.

Horizontal Fixation Field Width Determining Step

A horizontal fixation field width determining step is a step of determining the horizontal fixation field width Fw extending from the distance eyepoint FP in the horizontal direction.

First, a customer is asked to wear spectacles to which the spectacle lens 10 under test is attached and direct the line of sight forward so that the wearer views a distant object in a relaxed state. An image of a side of the wearer in this state is captured with the side image capturing unit 4, and the spectacle fitting distance EL is determined based on the image. The spectacle fitting distance EL and a preset horizontal fixation viewing angle Fa are used to calculate the horizontal fixation field width Fw. The data on horizontal fixation field width Fw is inputted to the selection unit 7 (S101).

Eyeball Infraduction Value Measuring Step

A description will be made of a method for determining the eyeball infraduction value Indih by using the eyeball infraduction value measurement unit 1 shown in FIGS. 3A and 3B. First, the side image capturing unit 4 captures an image of the wearer wearing the spectacles to which the spectacle lens 10 under test (a test spectacle lens 10) is attached and measures the forward inclination angle θ. The wearer is then asked to direct the line of sight forward so that the wearer views a distant object, and the front image capturing section 32 is so positioned that it faces the front side of the wearer. The front image capturing section 32 captures an image of the front side of the wearer while being moved by the moving mechanism 33. Specifically, the front image capturing section 32 is located in a position where the line of sight of the wearer who faces forward is estimated to pass and starts capturing an image.

First, the front image capturing section 32 captures an image of the wearer with the light irradiation section 31 turned off, and the light irradiation section 31 irradiates the eyeball E of the wearer with light, as shown in FIG. 4A. When the color of the pupil portion in the image captured with the front image capturing section 32 is red as shown in FIG. 4B, the position of the front image capturing section 32 corresponds to the distance eyepoint FP and the front image capturing section 32 stores the angle thereof. When the color of the pupil portion is not red, the front image capturing section 32 is gradually moved until the position of the distance eyepoint FP is determined. The front image capturing section 32 is then slowly moved downward until the position of the lower end 20P of the spectacle lens 10 faces the front image capturing section 32, and the position of the front image capturing section 32 is determined. The apparent length K between the distance eyepoint FP and the lower end 20P of the spectacle lens 10 is thus measured.

Thereafter, the wearer is asked to direct the line of sight downward so that the wearer views a near object in a relaxed state. The front image capturing section 32 is moved by the moving mechanism 33 to a position that is estimated to correspond to the downward line of sight and captures an image of the wearer. First, the front image capturing section 32 captures an image of the wearer with the light irradiation section 31 turned off as shown in FIG. 5A, and the light irradiation section 31 irradiates the eyeball E of the wearer with light. When the color of the pupil portion in the image captured with the front image capturing section 32 is red as shown in FIG. 5B, the position of the front image capturing section 32 corresponds to the reading eyepoint NP and the angle α between the forward line of sight and the downward line of sight is the eyeball infraduction angle. When the color of the pupil portion is not red, the front image capturing section 32 is gradually moved until the position of the reading eyepoint NP is determined. The front image capturing section 32 is then slowly moved downward until the position of the lower end 20P of the spectacle lens 10 faces the front image capturing section 32, and the position of the front image capturing section 32 is determined. The apparent length M between the reading eyepoint NP and the lower end 20P of the spectacle lens 10 is thus measured.

The data measured in the steps described above are outputted to the length calculating unit 5, where the eyeball infraduction value Indih is calculated based on Equations (a) to (f) described above.

The data on the eyeball infraduction value Indih is inputted to the selection unit 7 (S102), as shown in FIG. 17.

The following information is then inputted to the selection unit 7: the distance portion eyepoint height Fh, the reading portion eyepoint height Nh, the lens portion height Bh, the progressive corridor length SPh, the upper frame height Oh, the lower frame height Uh, and other lens information and frame information (S103).

Computation Step

The data described above are sent to the computation section 702, where ΔE is computed based on the eyeball infraduction value Indih, the distance portion eyepoint height Fh, the progressive corridor length SPh, and the reading portion eyepoint height Nh, and the upper frame height Oh is computed based on the ΔE, the lens portion height Bh, the distance portion eyepoint height Fh, the progressive corridor length SPh, the reading portion eyepoint height Nh, and the lower frame height Uh (S104).

Judgment Step

The judgment section 704 makes judgment as described above for the three types of spectacle lens 10 (three types of target spectacle lens 10) based on the computation results provided from the computation section 702 and the horizontal fixation field width Fw.

Figure 18A:
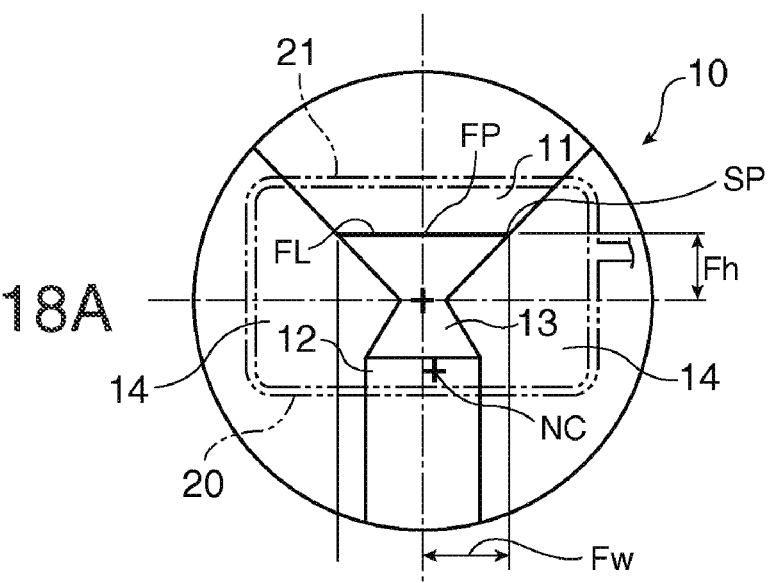
FIGS. 18A to 18C are schematic views showing three types of spectacle lens mainly for reading and distance vision having different distance portion sizes.
Figure 18B:
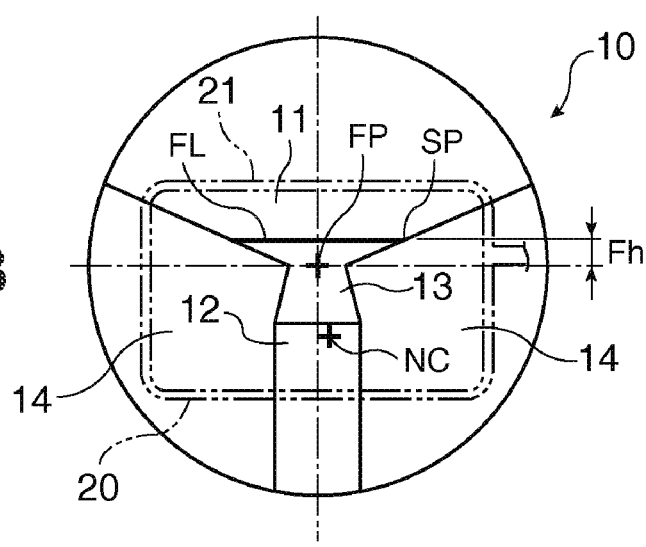
Figure 18C:
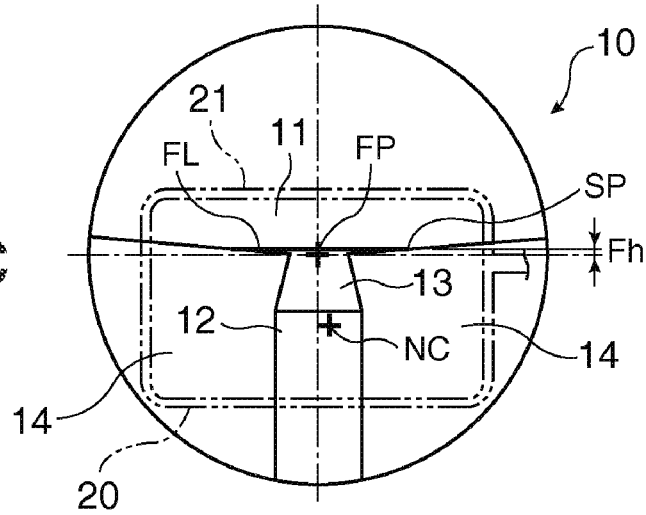

For example, for the spectacle lens 10 mainly for reading and distance vision shown in FIGS. 18A to 18C, the judgment section 704 judges whether or not the following conditions are satisfied: 4 mm<Fh, 0 mm≦ΔE≦2 mm, and 0 mm<Oh (S105). When the conditions are satisfied, the type-C spectacle lens 10 shown in FIG. 18A is selected (S106), whereas when the conditions are not satisfied, the judgment section 704 judges whether or not the-type B lens satisfies relevant conditions (S107).

The conditions under which the type-B lens is selected are 3 mm<Fh≦4 mm, 0 mm≦ΔE≦2 mm, and 0 mm<Oh. When the conditions are satisfied, the type-B spectacle lens 10 shown in FIG. 18B is selected (S108), whereas when the conditions are not satisfied, the judgment section 704 judges whether or not the type-A lens satisfies relevant conditions (S109).

The conditions under which the type-A lens is selected are 1 mm≦Fh≦3 mm, 0 mm≦ΔE≦2 mm, and 0 mm<Oh. When the conditions are satisfied, the type-A spectacle lens 10 shown in FIG. 18C is selected (S110), whereas when the conditions are not satisfied, a lens other than those of the types A to C is selected (S111).

A method for selecting a spectacle lens mainly for reading and intermediate vision will next be described with reference to FIGS. 19 and 20A to 20C. A spectacle lens mainly for reading and intermediate vision has a horizontal fixation field width Fw greater than 4.5 mm but smaller than or equal to 6 mm.

Figure 19:
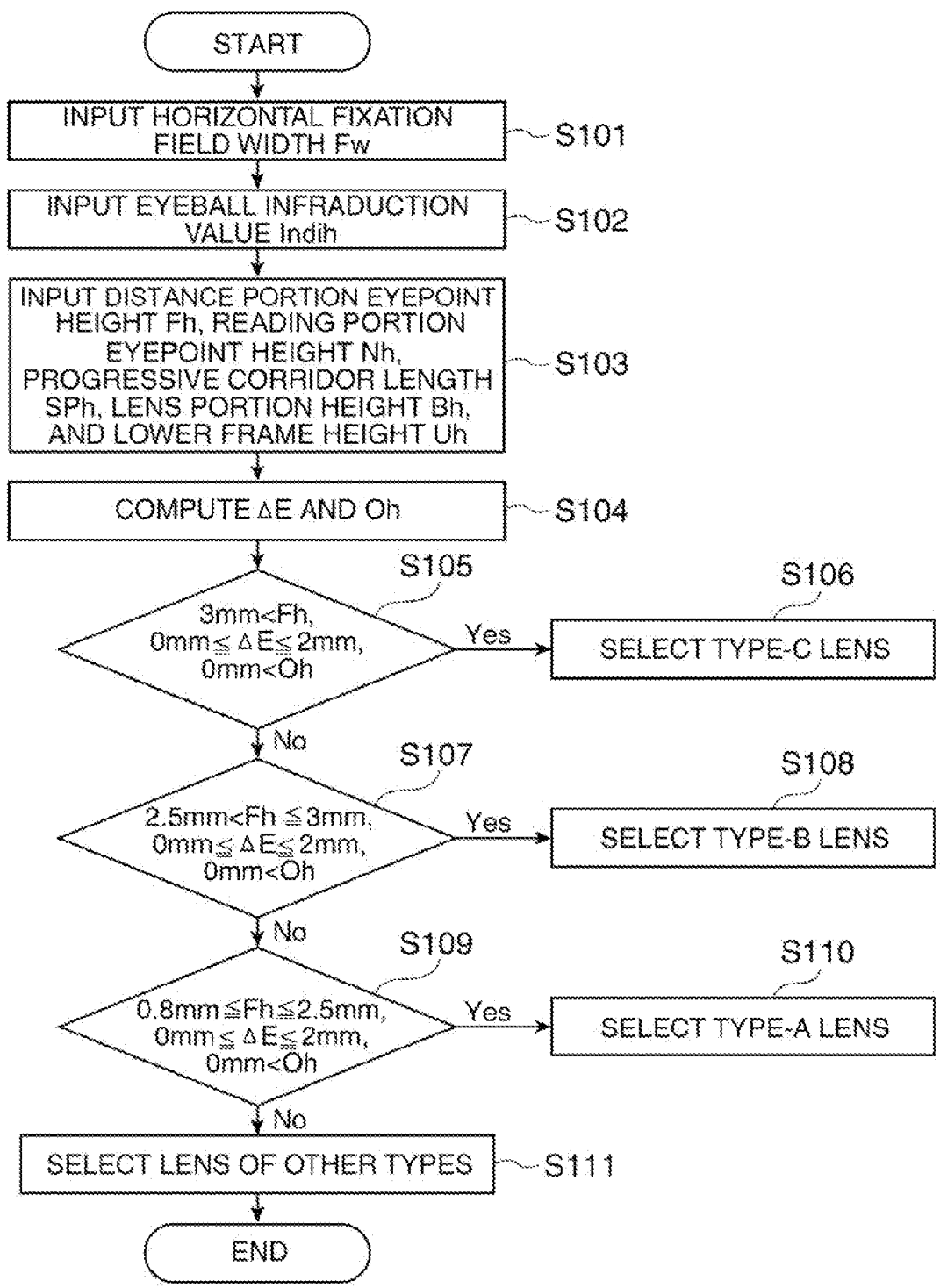
FIG. 19 is a flowchart for describing a spectacle lens selection method according to an embodiment of the invention for selecting a spectacle lens mainly for reading and intermediate vision.
Figure 20A:
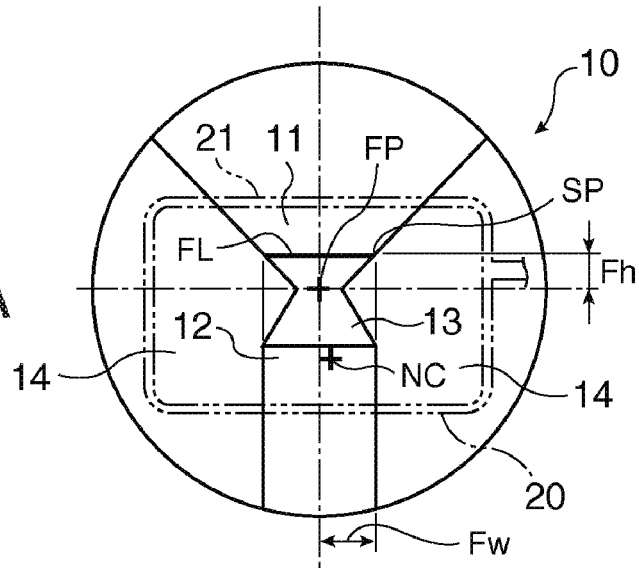
FIGS. 20A to 20C are schematic views showing three types of spectacle lens mainly for reading and intermediate vision having different distance portion sizes.
Figure 20B:
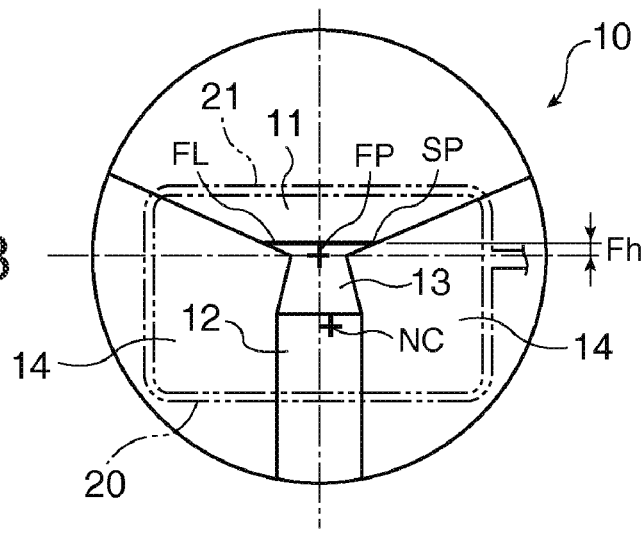
Figure 20C:
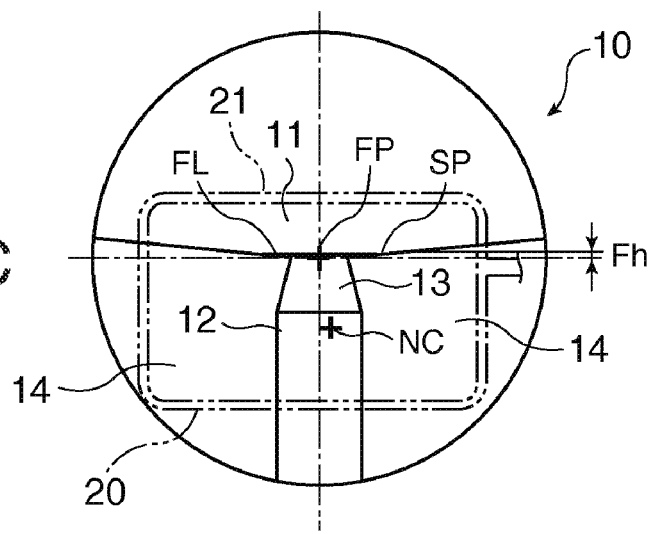

FIG. 19 is a flowchart used to select a spectacle lens mainly for reading and intermediate vision. The method for selecting a spectacle lens mainly for reading and intermediate vision is the same in terms of procedure as the method for selecting a spectacle lens mainly for reading and distance vision shown in FIG. 17 but differs therefrom in terms of values in the lens selection conditions, as shown in FIG. 19. That is, for a spectacle lens 10 mainly for reading and intermediate vision, the judgment section 704 judges whether or not the following conditions are satisfied: 3 mm<Fh, 0 mm≦ΔE≦2 mm, and 0 mm<Oh (S105). When the conditions are satisfied, the type-C spectacle lens 10 shown in FIG. 20A is selected (S106), whereas when the conditions are not satisfied, the judgment section 704 judges whether or not the type-B lens satisfies relevant conditions (S107). The conditions under which the type-B lens is selected are 2.5 mm<Fh≦3 mm, 0 mm≦ΔE≦2 mm, and 0 mm<Oh. When the conditions are satisfied, the type-B spectacle lens 10 shown in FIG. 20B is selected (S108), whereas when the conditions are not satisfied, the judgment section 704 judges whether or not the type-A lens satisfies relevant conditions (S109). The conditions under which the type-A lens is selected are 0.8 mm≦Fh≦2.5 mm, 0 mm≦ΔE≦2 mm, and 0 mm<Oh. When the conditions are satisfied, the type-A spectacle lens 10 shown in FIG. 20C is selected (S110), whereas when the conditions are not satisfied, a lens other than those of the types A to C is selected (S111).

A method for selecting a spectacle lens mainly for reading and reading vision will next be described with reference to FIGS. 21 and 22A to 22C. A spectacle lens mainly for reading and reading vision has a horizontal fixation field width Fw greater than 3.75 mm but smaller than or equal to 4.5 mm.

Figure 21:
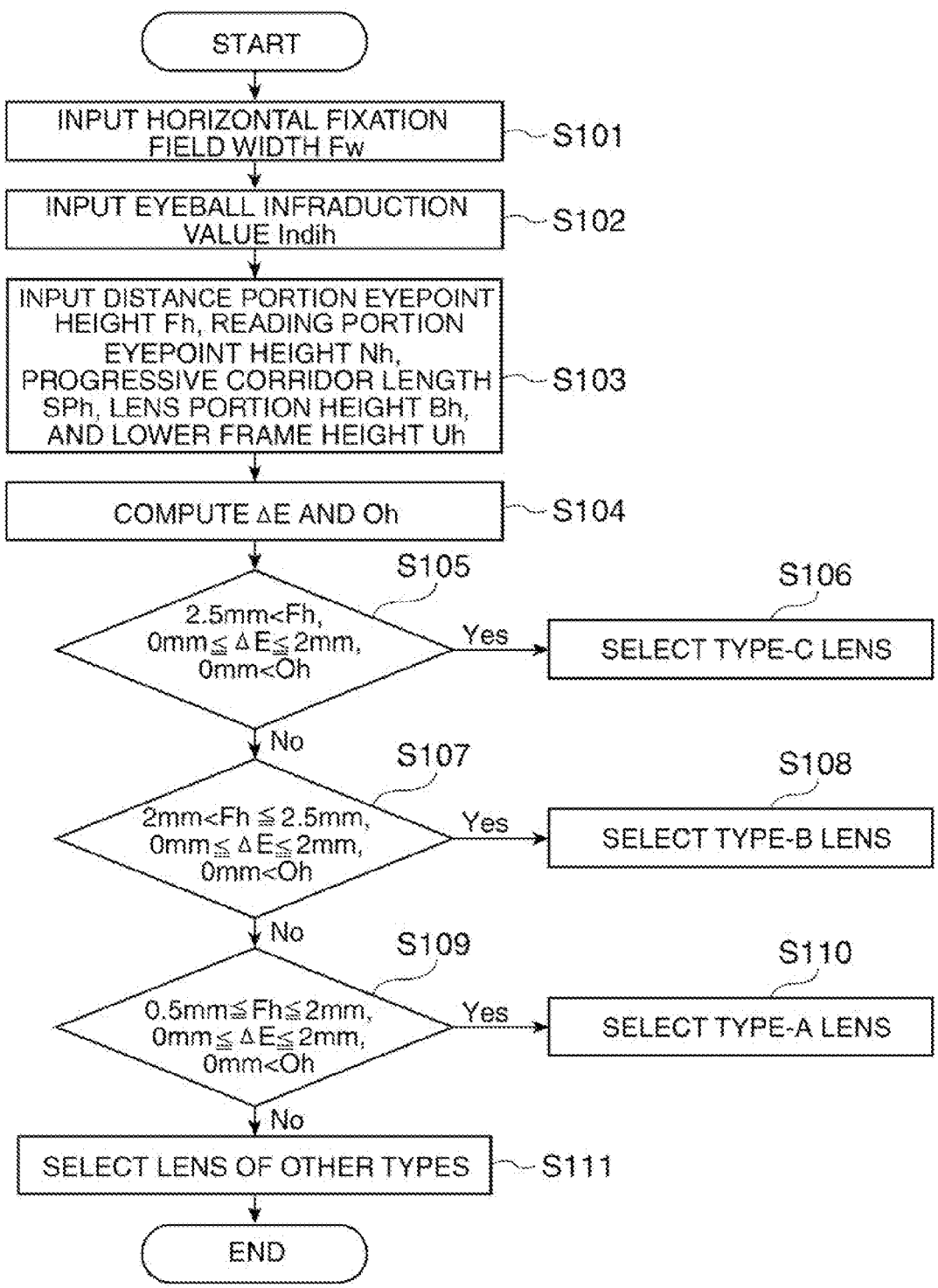
FIG. 21 is a flowchart for describing a spectacle selection method according to an embodiment of the invention for selecting a spectacle lens mainly for reading and reading vision.
Figure 22A:
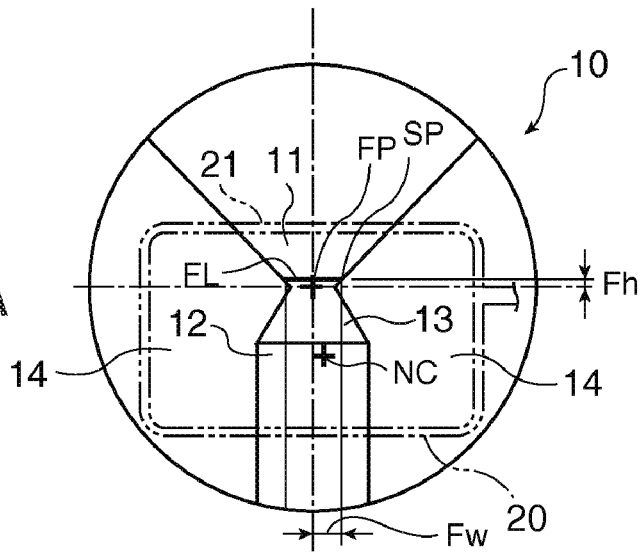
FIGS. 22A to 22C are schematic views showing three types of spectacle lens mainly for reading and reading vision having different distance portion sizes.
Figure 22B:
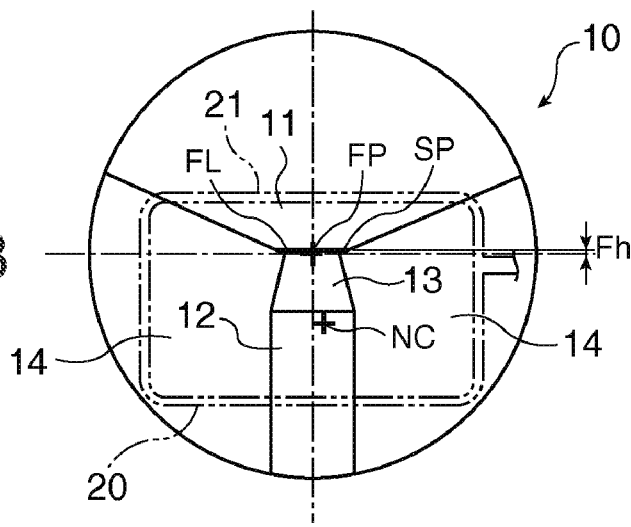
Figure 22C:
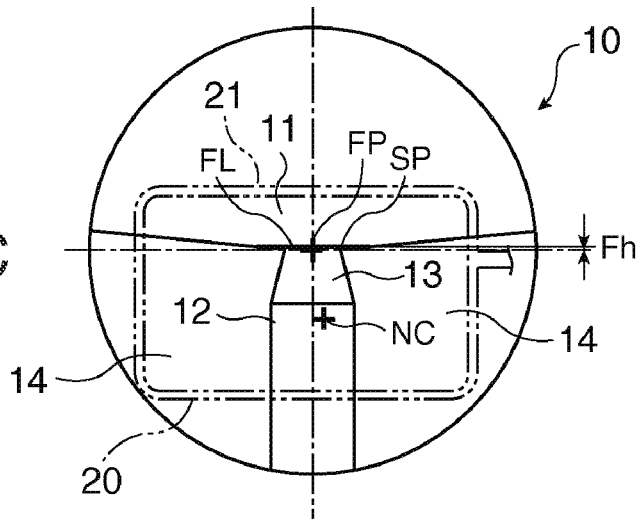

FIG. 21 is a flowchart used to select a spectacle lens mainly for reading and reading vision. The method for selecting a spectacle lens mainly for reading and reading vision is the same in terms of procedure as the method for selecting a spectacle lens mainly for reading and distance vision shown in FIG. 17 but differs therefrom in terms of values in the lens selection conditions, as shown in FIG. 21. That is, for a spectacle lens 10 mainly for reading and reading vision, the judgment section 704 judges whether or not the following conditions are satisfied: 2.5 mm<Fh, 0 mm≦ΔE≦2 mm, and 0 mm<Oh (S105). When the conditions are satisfied, the type-C spectacle lens 10 shown in FIG. 22A is selected (S106), whereas when the conditions are not satisfied, the judgment section 704 judges whether or not the type-B lens satisfies relevant conditions (S107). The conditions under which the type-B lens is selected are 2 mm<Fh≦2.5 mm, 0 mm≦ΔE≦2 mm, and 0 mm<Oh. When the conditions are satisfied, the type-B spectacle lens 10 shown in FIG. 22B is selected (S108), whereas when the conditions are not satisfied, the judgment section 704 judges whether or not the type-A lens satisfies relevant conditions (S109). The conditions under which the type-A lens is selected are 0.5 mm≦Fh≦2 mm, 0 mm≦ΔE≦2 mm, and 0 mm<Oh. When the conditions are satisfied, the type-A spectacle lens 10 shown in FIG. 22C is selected (S110), whereas when the conditions are not satisfied, a lens other than those of the types A to C is selected (S111).

The present embodiment can therefore provide the following advantageous effects.

(1) The side image capturing unit 4 carries out the horizontal fixation field width determining step of determining the horizontal fixation field width Fw extending from the distance eyepoint FP in the horizontal direction. The eyeball infraduction value measurement unit 1 or 2 carries out the eyeball infraduction value measuring step of measuring the eyeball infraduction value Indih. The computation section 702 carries out the computation step including the procedure of determining ΔE from the equation ΔE=Indih−(Fh+SPh+Nh) based on the eyeball infraduction value Indih, the distance portion eyepoint height Fh, the progressive corridor length SPh, and the reading portion eyepoint Nh and the procedure of determining Oh from the equation Oh=Bh−(Fh+SPh+Nh+ΔE+Uh) based on the ΔE, the lens portion height Bh, the distance portion eyepoint height Fh, the progressive corridor length SPh, the reading portion eyepoint height Nh, and the lower frame height Uh. The judgment section 704 carries out the judgment step of judging whether or not the following conditions are satisfied: A determined value of the horizontal fixation field width Fw is ensured; 0≦ΔE≦2 mm; and 0 mm<Oh. As a result, in selecting a single progressive-power spectacle lens from a plurality of types of progressive-power spectacle lens, since it is required to satisfy a certain horizontal fixation field width Fw, a horizontal range within which the wearer can view objects without moving the head is ensured in the first place. Since it is required to satisfy 0 mm≦ΔE, the wearer can see objects through the distance portion and reading portion of the spectacle lens. Further, since ΔE≦2 mm, which means that a 2-mm margin of the frame 20 is taken into consideration, rational design can be performed. Moreover, since 0 mm<Oh, a minimum size of distance portion is ensured in the spectacle frame selected by the wearer. As a result, a spectacle lens 10 that causes no fatigue in the wearer can be rationally designed, and no unit for capturing motion of the eye and the head or no software for performing complicated processes is necessary, whereby the spectacle lens selection can be performed at low cost.

(2) The judgment step is first carried out for a spectacle lens 10 having a narrow distance portion 11. When conditions in the judgment step are satisfied, the spectacle lens under judgment is selected, whereas when the distance portion eyepoint height Fh does not satisfy the corresponding one of the conditions in the judgment step, the judgment step is then carried out for a spectacle lens 10 having a wider distance portion 11 instead of the spectacle lens 10 having a narrow distance portion 11. Since the judgment step is carried out for spectacle lenses 10 in ascending order of the size of the distance portion, that is, from a narrow distance portion 11 to a wide distance portion 11, a preferred spectacle lens can be provided to a wearer who uses a progressive-power spectacle lens for the first time or a wearer who has used a progressive-power spectacle lens only for a short period.

(3) A single spectacle lens 10 is selected from three types of spectacle lens 10, a type A in which the distance portion 11 is wide, a type B in which the distance portion 11 is intermediate, and a type C in which the distance portion 11 is narrow. In selecting a single spectacle lens 10 from those of the three types, a single spectacle lens preferable to a wearer can be rationally selected from the three types of spectacle lens, the type A in which the distance portion 11 is wide, the type B in which the distance portion 11 is intermediate, and the type C in which the distance portion 11 is narrow.

That is, in selecting a spectacle lens mainly for reading and distance vision, in which the horizontal fixation field width Fw is greater than 6 mm, the type-C spectacle lens having a narrow distance portion 11 is selected when 4 mm<Fh, the type-B spectacle lens having an intermediate distance portion 11 is selected when 3 mm<Fh≦4 mm, and the type-A spectacle lens having a wide distance portion 11 is selected when 1 mm≦Fh≦3 mm. In selecting a spectacle lens mainly for reading and intermediate vision, in which the horizontal fixation field width Fw is greater than 4.5 mm but smaller than or equal to 6 mm, the type-C spectacle lens having a narrow distance portion is selected when 3 mm<Fh, the type-B spectacle lens having an intermediate distance portion is selected when 2.5 mm<Fh≦3 mm, and the type-A spectacle lens having a wide distance portion is selected when 0.8 mm≦Fh≦2.5 mm. In selecting a spectacle lens mainly for reading and reading vision, in which the horizontal fixation field width Fw is greater than 3.75 mm but smaller than or equal to 4.5 mm, the type-C spectacle lens having a narrow distance portion is selected when 2.5 mm<Fh, the type-B spectacle lens having an intermediate distance portion is selected when 2 mm<Fh≦2.5 mm, and the type-A spectacle lens having a wide distance portion is selected when 0.5 mm≦Fh≦2 mm. Since a single spectacle lens preferable to a wearer can be rationally selected from the three types of spectacle lens, the type A in which the distance portion 11 is wide, the type B in which the distance portion 11 is intermediate, and the type C in which the distance portion 11 is narrow, for a variety of spectacle lenses, a spectacle lens mainly for reading and distance vision, a spectacle lens mainly for reading and intermediate vision, and a spectacle lens mainly for reading and reading vision, a spectacle lens more preferable to the wearer can be provided. In particular, since the type-C spectacle lens 10, in which the distance portion 11 is narrow, is selected when 4 mm<Fh for a spectacle lens mainly for reading and distance vision, a spectacle lens 10 preferable to a wearer who uses a progressive-power spectacle lens for the first time can be provided.

(4) In the horizontal fixation field width determining step, the horizontal fixation field width Fw is determined from the equation Fw=EL×tan Fa based on the horizontal fixation viewing angle Fa and the spectacle fitting distance EL. As a result, the horizontal fixation field width Fw can be readily and accurately calculated, whereby the judgment step can be carried out based on an accurate judgment criterion and a correct spectacle lens can be selected.

(5) Based on the fact that the horizontal fixation viewing angle Fa varies little among individual wearers, the horizontal fixation viewing angle Fa is fixed in each of the following spectacle lens groups: spectacle lenses 10 mainly for reading and distance vision; spectacle lenses 10 mainly for reading and intermediate vision; and spectacle lenses 10 mainly for reading and intermediate vision. As a result, the horizontal fixation field width Fw can be readily determined, whereby the lens selection procedure can be simplified and the lens design cost can be reduced.

(6) Since spectacle lenses 10 mainly for reading and distance vision, spectacle lenses 10 mainly for reading and intermediate vision, and spectacle lenses 10 mainly for reading and reading vision have respective horizontal fixation viewing angles Fa for determining the horizontal fixation field widths Fw, a preferred spectacle lens can be selected in accordance with applications of the spectacle lens.

(7) Each of the eyeball infraduction value measurement unit 1 and 2 includes the sight line position detecting unit 3, which detects the position of the line of sight of a spectacle wearer that corresponds to the distance eyepoint FP and the position of the line of sight of the spectacle wearer that corresponds to the reading eyepoint NP, and the length calculating unit 5, which calculates the length between the position of the distance eyepoint FP and the position of the reading eyepoint NP detected by the sight line position detecting unit 3 and outputs the calculated length to the computation section 702. Since the position of the line of sight of an eyeball that looks at the reading eyepoint NP differs from the position of the line of sight of the eyeball that looks at the distance eyepoint FP, the eyeball infraduction value Indih can be readily measured by detecting these positions, whereby the computation step and the judgment step can be precisely carried out.

(8) Since the side image capturing unit 4 provided as a forward inclination angle measuring unit that measures the forward inclination angle θ of the frame 20 to which the spectacle lens 10 is attached allows the forward inclination angle θ to be measured with the wearer wearing the spectacles, the forward inclination angle θ can be accurately measured even when the spectacle lens is worn by the wearer, whereby the computation step and the judgment step can be precisely carried out.

It is, of course, intended that the invention is not limited to the embodiment described above and that changes and modifications made thereto to the extent that the advantages of the invention can be achieved fall within the scope of the invention.

For example, in the embodiment described above, a single optimum spectacle lens 10 is selected from the three types of spectacle lens 10, the type A in which the distance portion 11 is wide, the type B in which the distance portion 11 is intermediate, and the type C in which the distance portion 11 is narrow. Alternatively, in an embodiment of the invention, the distance portion 11 may be roughly classified into two in terms of its size, and a single spectacle lens may be selected from the two types. Still alternatively, the distance portion 11 may be classified into four in terms of its size, and a single spectacle lens may be selected from the four types.

Further, in the horizontal fixation field width determining step, the horizontal fixation viewing angle Fa may be set differently for each individual wearer. Alternatively, the horizontal fixation viewing angle Fa may be the same for spectacle lenses 10 mainly for reading and distance vision, spectacle lenses 10 mainly for reading and intermediate vision, and spectacle lenses 10 mainly for reading and reading vision.

Further, Table 8 shown in FIG. 15 may be created in advance and contained in a manual, and a spectacle lens may be selected based on the manual.

The invention can be widely used as an unit for selecting a progressive-power lens in a spectacle shop or any other similar location.

What is claimed is:

1. A spectacle lens selection method to select a single spectacle lens including a distance portion, a progressive corridor, and a reading portion from a plurality of target spectacle lens, the method comprising:
   determining a horizontal fixation field width Fw, the Fw extending from a distance eyepoint in a horizontal direction;
   measuring an eyeball infraduction value Indih, the Indih being a length from the distance eyepoint to a reading eyepoint;
   determining a ΔE from Equation (1) based on the Indih, a distance portion eyepoint height Fh from a boundary between the distance portion and the progressive corridor to the distance eyepoint, a progressive corridor length SPh, the SPh being a length from the boundary between the distance portion and the progressive corridor to a boundary between the progressive corridor and the reading portion, and a reading portion eyepoint height Nh from the boundary between the progressive corridor and the reading portion to an optical center of the reading portion;
   determining a th from Equation (2) based on the Fh, the SPh, and the Nh;
   determining an upper frame height Oh from the distance eyepoint to an upper end of a test spectacle lens from Equation (3) based on a lens portion height Bh of the test spectacle lens, the th, the ΔE, and a lower frame height Uh from a lower end of the test spectacle lens to the reading eyepoint, $$\Delta E = Indih - (Fh + SPh + Nh) \quad (1)$$

$$th = Fh + SPh + Nh \quad (2)$$

$$Oh = Bh - (th + \Delta E + Uh) \quad (3);$$

judging a target spectacle lens satisfied the Fw and conditions of 0 mm≦ΔE≦2 mm and 0 mm<Oh; and
   selecting a spectacle lens satisfied the Fw and the conditions.

2. The spectacle lens selection method according to claim 1, wherein
   judging the target spectacle lens is first carried out for a spectacle lens having narrow distance portion,
   when the Fh does not satisfy a predetermined condition, judging the target spectacle lens is carried out for a spectacle lens having wider distance portion than the spectacle lens having narrow distance portion.

3. The spectacle lens selection method according to claim 2, wherein
   in selecting a single spectacle lens having a horizontal fixation field width Fw greater than 6 mm from three types of target spectacle lens, first spectacle lens having narrow distance portion, second spectacle lens having wide distance portion, and third spectacle lens having intermediate distance portion, the first spectacle lens is selected when 4 mm<Fh, the third spectacle lens is selected when 3 mm<Fh≦4 mm, and the second spectacle lens is selected when 1 mm≦Fh≦3 mm.

4. The spectacle lens selection method according to claim 2, wherein
   in selecting a single spectacle lens having a horizontal fixation field width Fw greater than 4.5 mm but smaller than or equal to 6 mm from three types of target spectacle lens, first spectacle lens having a narrow distance portion, second spectacle lens having a wide distance portion, and third spectacle lens having a intermediate distance portion, the first spectacle lens is selected when 3 mm<Fh, the third spectacle lens is selected when 2.5 mm<Fh≦3 mm, and the third spectacle lens is selected when 0.8 mm≦Fh≦2.5 mm.

5. The spectacle lens selection method according to claim 2, wherein
   in selecting a single spectacle lens having a horizontal fixation field width Fw greater than 3.75 mm but smaller than or equal to 4.5 mm from three types of target spectacle lens, first spectacle lens having a narrow distance portion, second spectacle lens having a wide distance portion, and third spectacle lens having a intermediate distance portion is intermediate, the first spectacle lens is selected when 2.5 mm<Fh, a third spectacle lens is selected when 2 mm<Fh≦2.5 mm, and the second spectacle lens is selected when 0.5 mm≦Fh≦2 mm.

6. The spectacle lens selection method according to claim 3, wherein
   the Fw is determined from Equation (4) based on a horizontal fixation field angle Fa and a spectacle fitting distance EL between the distance eyepoint and the eyeball:

$$Fw = EL \times \tan Fa \quad (4).$$

7. The spectacle lens selection method according to claim 6, wherein
   the Fa is a predetermined range value.

8. A spectacle lens selection system to select a spectacle lens including a distance portion, a progressive corridor, and a reading portion, the system comprising:
   a horizontal fixation field width determination unit that determines a horizontal fixation field width Fw, the Fw extending from a distance eyepoint of a test spectacle lens in a horizontal direction;
   an eyeball infraduction value measurement unit that measures an eyeball infraduction value Indih, the Indih being a length from the distance eyepoint to a reading eyepoint; and
   a selection unit that selects a single spectacle lens from a plurality of types of target spectacle lens based on information containing a value measured by the eyeball infraduction value measurement unit, the selection unit including;
   unit a computation section that determines;
   a ΔE from Equation (1) based on the Indih, a distance portion eyepoint height Fh from a boundary between the distance portion and the progressive corridor to the distance eyepoint, a progressive corridor length SPh, the SPh being a length from the boundary between the distance portion and the progressive corridor to a boundary between the progressive corridor and the reading portion, and a reading portion eyepoint height Nh from the boundary between the progressive corridor and the reading portion to an optical center of the reading portion;

a th from Equation (2) based on the Fh, the SPh, and Nh; and an upper frame height Oh from the distance eyepoint to an upper end of a test spectacle lens from Equation (3) based on a lens portion height Bh of the test spectacle lens, the th, the $\Delta E$, and a lower frame height Uh from a lower end of the test spectacle lens to the reading eyepoint, $$\Delta E = Indih - (Fh + SPh + Nh) \quad (1)$$

$$th = Fh + SPh + Nh \quad (2)$$

$$Oh = Bh - (th + \Delta E + Uh) \quad (3); \text{ and}$$

a judgment section that judges a target spectacle lens that satisfies the Fw unit and conditions of $0 \text{ mm} \leq \Delta E \leq 2$ mm and $0 \text{ mm} < Oh$, and selects a spectacle lens that satisfied the Fw and the conditions.

9. The spectacle lens selection system according to claim 8, the eyeball infraduction value measurement unit further includes;

a sight line position detecting unit that detects a position of a sight line of a spectacle wearer that corresponds to the distance eyepoint and a position of the sight line of the spectacle wearer that corresponds to the reading eyepoint, and a length calculating unit that calculates a length between the position of the distance eyepoint and the position of the reading eyepoint detected by the sight line position detecting unit and outputs a calculated value to the computation section.

10. The spectacle lens selection system according to claim 9, further comprising a forward inclination angle measuring unit that measures a forward inclination angle of a frame to which the test spectacle lens is attached.

* * * * *